(12) United States Patent
Takabatake et al.

(10) Patent No.: US 6,490,058 B1
(45) Date of Patent: Dec. 3, 2002

(54) IMAGE DECODING AND DISPLAY DEVICE

(75) Inventors: Akihiko Takabatake, Tokyo (JP); Ryohei Ohkawahara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/436,248

(22) Filed: Nov. 9, 1999

(30) Foreign Application Priority Data

Jun. 25, 1999 (JP) .......................................... 11-180371

(51) Int. Cl.[7] ................................................. H04N 1/32
(52) U.S. Cl. ........................ 358/442; 345/543; 345/547; 345/556
(58) Field of Search ................................ 382/232, 233; 345/543–556; 358/440, 442

(56) References Cited

U.S. PATENT DOCUMENTS

| | | | | |
|---|---|---|---|---|
| 5,245,702 A | * | 9/1993 | McIntyre et al. | ............ 345/545 |
| 5,548,740 A | * | 8/1996 | Kiyohara | ..................... 345/543 |
| 5,576,757 A | * | 11/1996 | Roberts et al. | ............. 348/207 |
| 5,586,234 A | * | 12/1996 | Sakuraba et al. | ........... 345/582 |
| 5,640,604 A | * | 6/1997 | Hirano | .......................... 710/56 |
| 5,742,274 A | * | 4/1998 | Henry et al. | ................. 345/545 |
| 5,929,868 A | * | 7/1999 | Howard et al. | ............. 345/545 |

FOREIGN PATENT DOCUMENTS

JP  10/322693  12/1998

* cited by examiner

*Primary Examiner*—Jingge Wu
(74) *Attorney, Agent, or Firm*—Burns, Doane, Swecker & Mathis, LLP

(57) ABSTRACT

An image decoding and display device includes a frame memory interface (3) and a frame memory (5). The frame memory (5) has a bank 0, a bank 1, a bank 2. The bank 2 is made up of plural sectors (sector 0, . . . , and sector N). Under a dynamic mapping mode, the frame memory interface (3) refers a sector information table (32) including sector use information in order to search and fetch an unused sector. The frame memory interface (3) allocates the unused sector in the bank 2 when decoded image data are written into the bank 2, and release the used sector when the decoded image data are read from the bank 2.

10 Claims, 14 Drawing Sheets

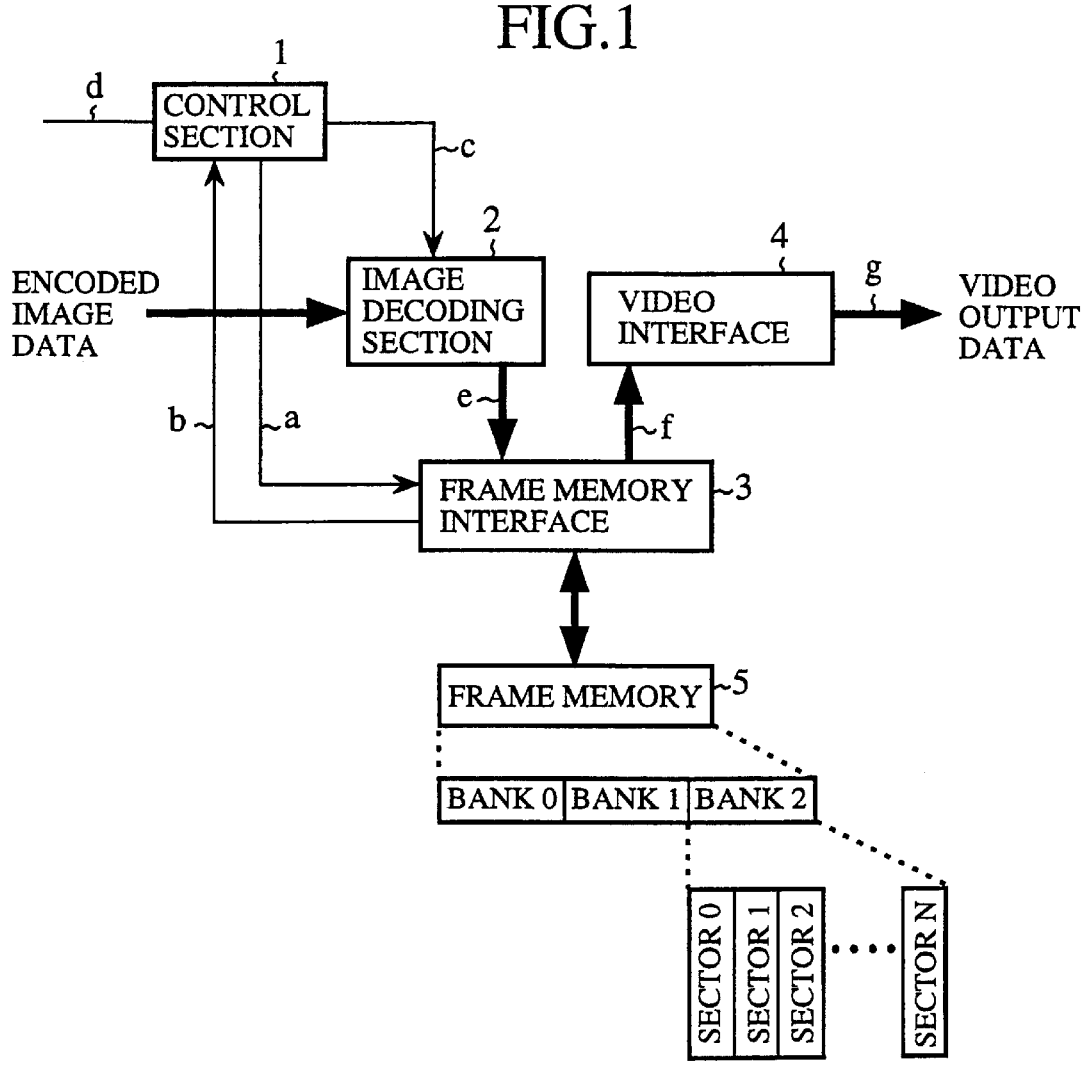
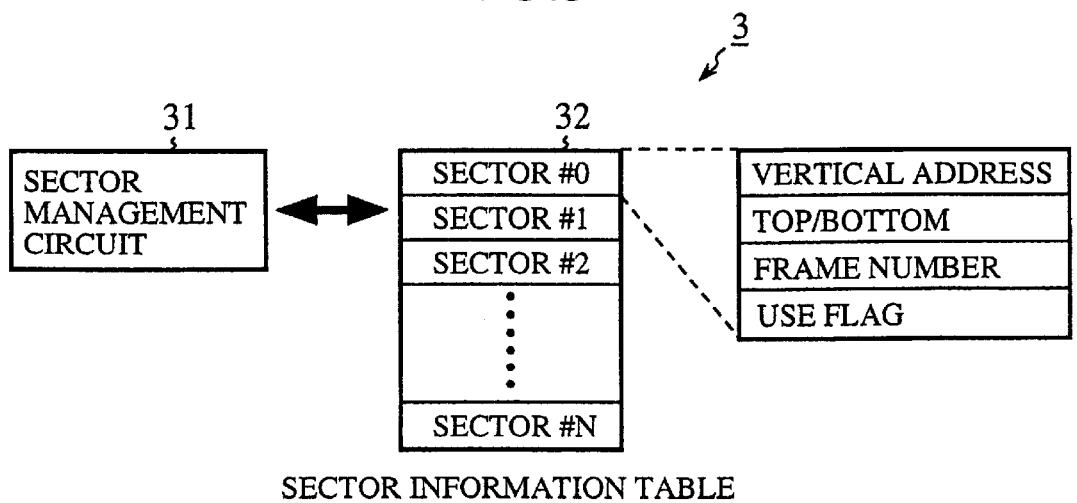

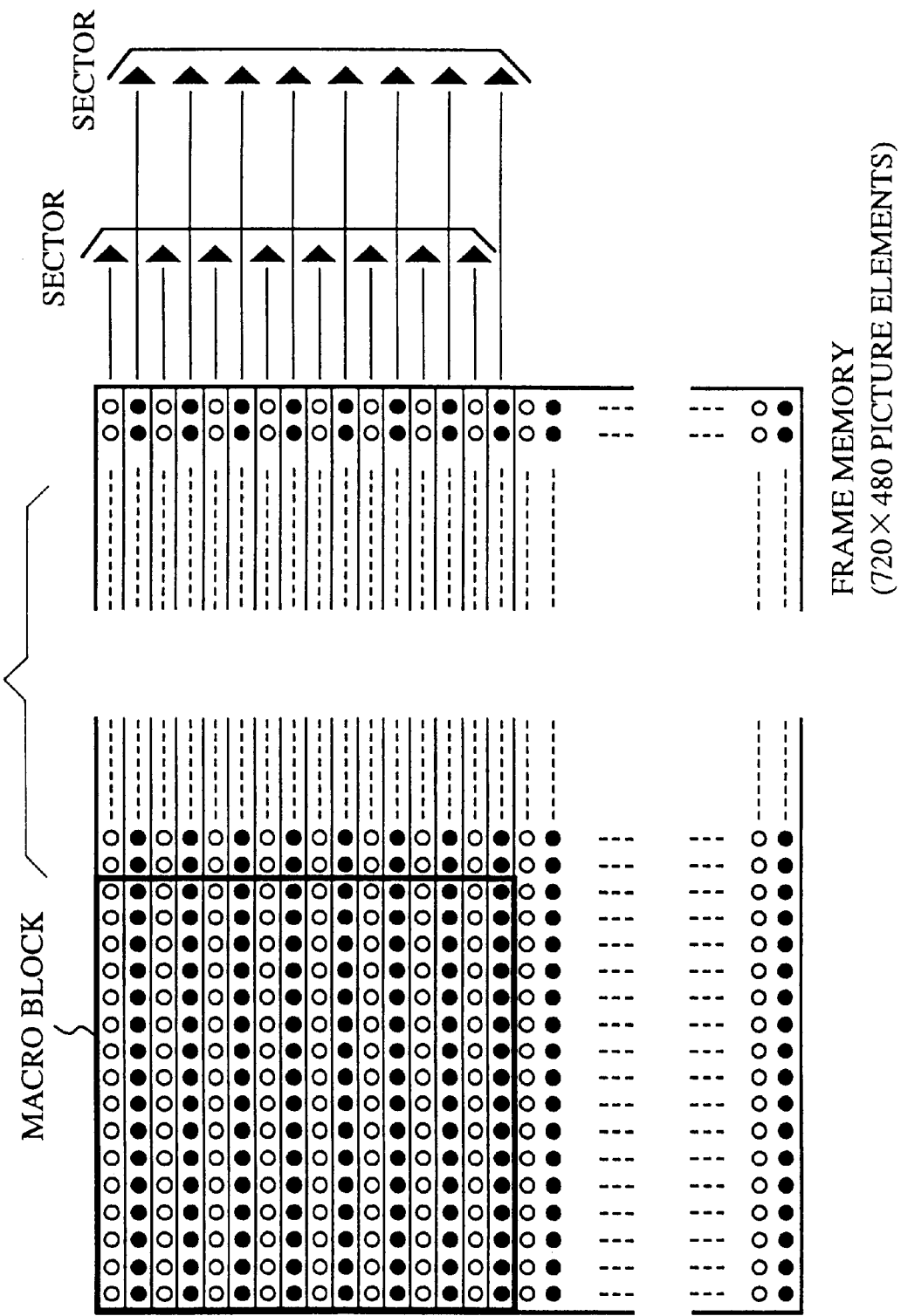

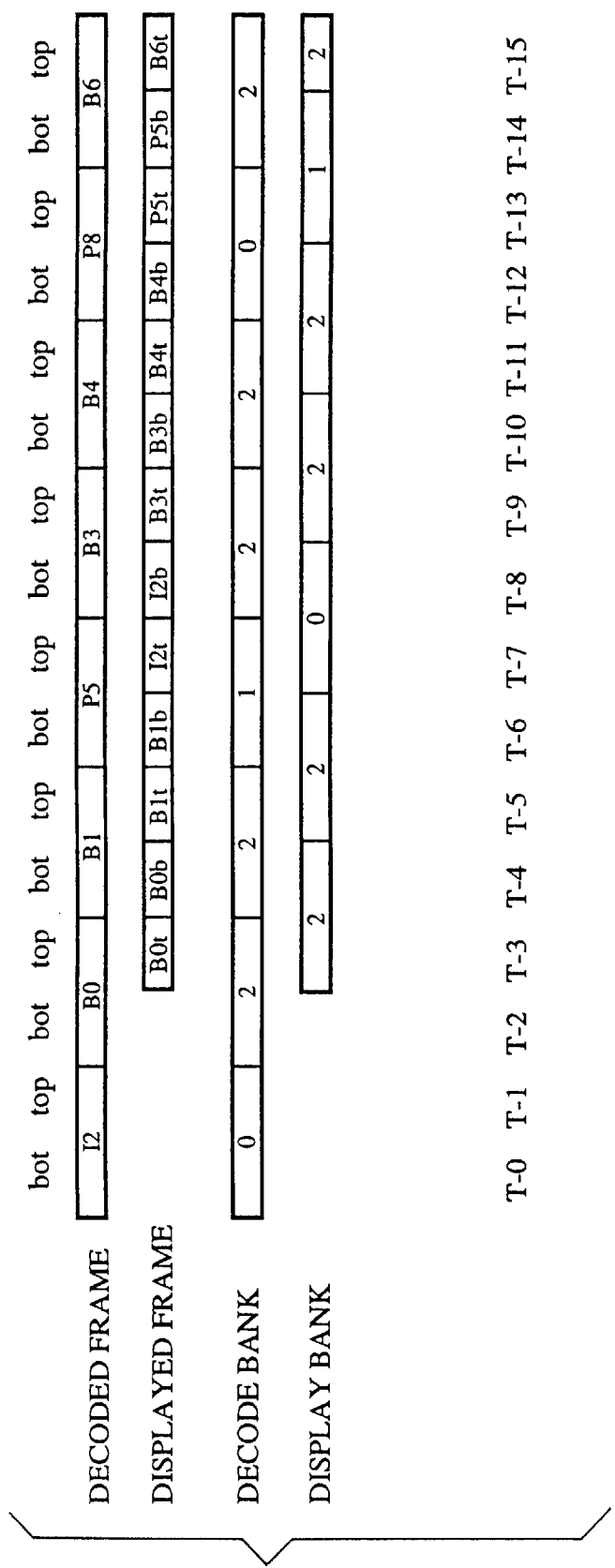

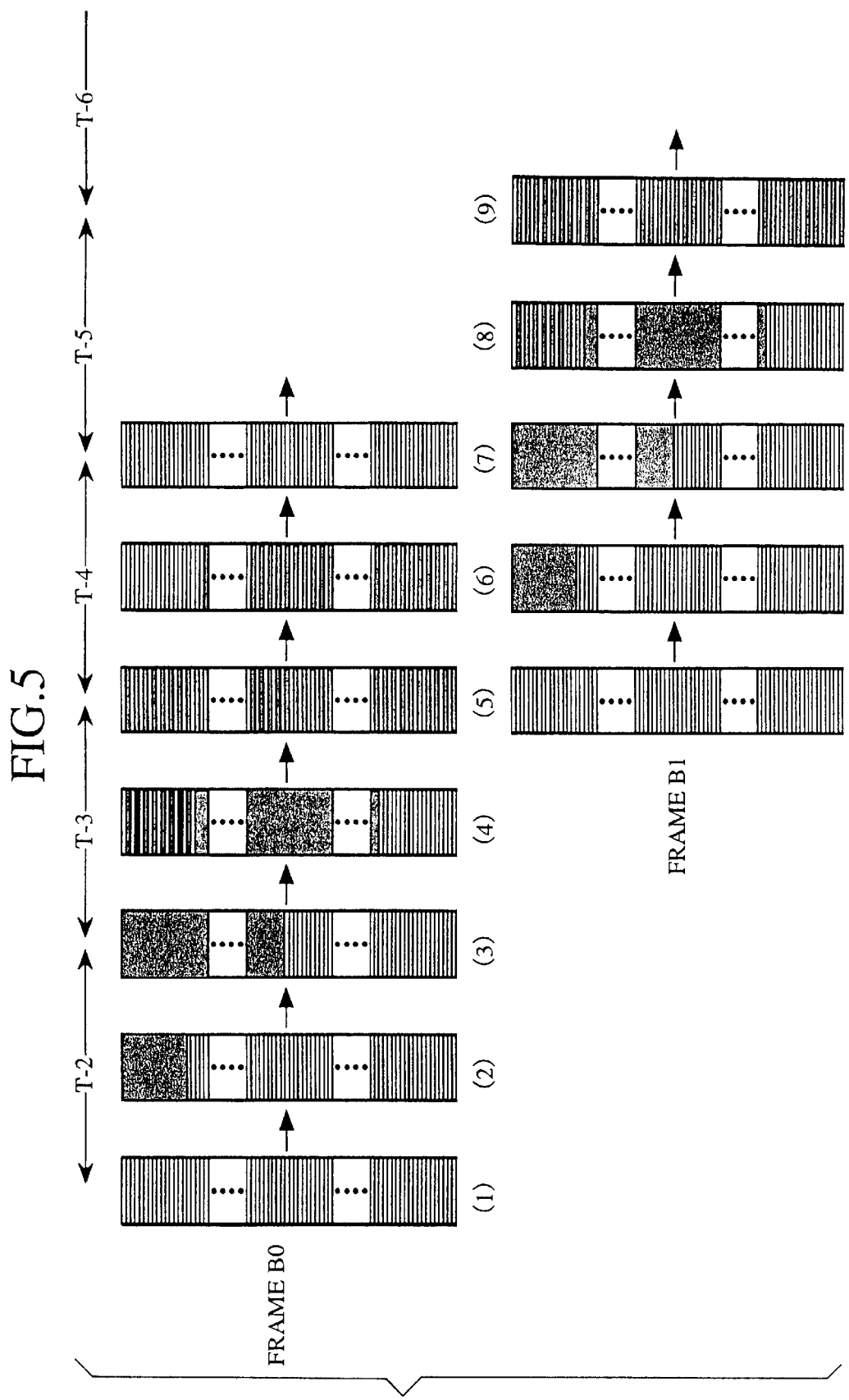

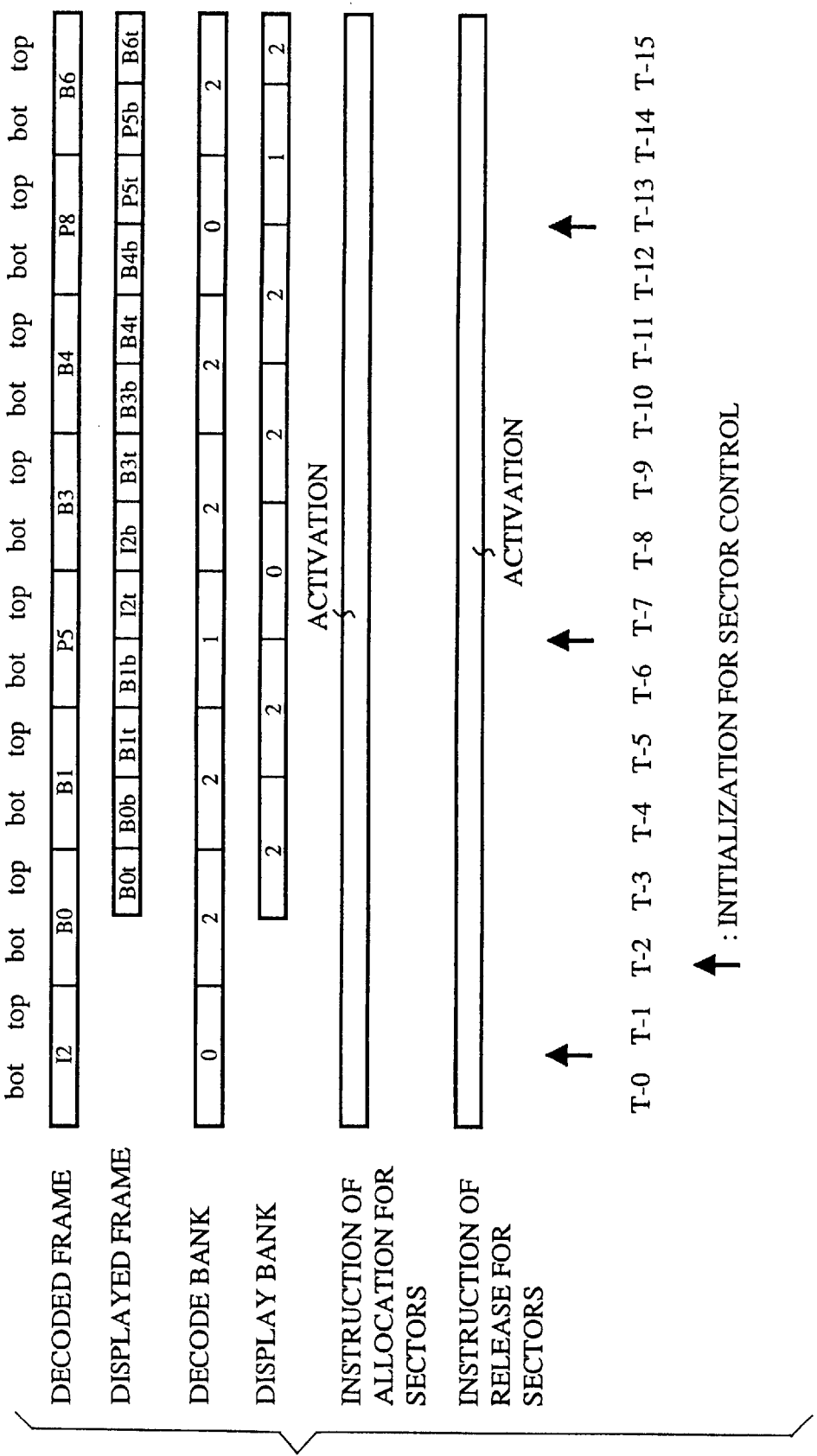

IMAGE DECODING AND DISPLAY DEVICE

BACKGROUND OF THE INVENTION

1. Field of the Invention

The present invention relates to an image decoding and display device for decoding compressed image data based on MPEG (Moving Picture Experts Group) and then displaying the decoded image data on a monitor.

2. Description of the Related Art

MPEG (Moving Picture Experts Group) method is a typical technique for synthetically handling audio data and image data in the multimedia field, and the MPEG method are widely applied to various communication applications.

A MEPG system has following function:

A stream of MPEG video data is synchronization with a stream of MPEG audio data (both data that have been encoded) in order to integrated them; and The integrated data are then converted to data having a data format that is applicable to an inherent physical format and a protocol to be used in recording mediums and networks.

For example, in the image data processing in a MPEG video decoder, a video stream that has been encoded in 24 frame/second is decoded in 30 frame/second. A 3:2 pull down display processing is also necessary in order to display the decoded video stream on a monitor.

When one frame is displayed on a monitor in the 3:2 pull down display processing, three fields (3 fields) and two fields (2 fields) must be displayed alternately.

Since the conventional image decoding and display device has the configuration and the function described above, it is necessary to incorporate a memory whose memory size is three frames when the pictures of three fields to be displayed are decoded image data of a B picture (Bi-directionally predicted picture). In other words, the conventional image decoding and display device must incorporates an additional memory region of three frames when the 3:2 pull down display processing is performed based on the MPEG method. This increases the size of the conventional image decoding and display device.

SUMMARY OF THE INVENTION

Accordingly, an object of the present invention is, with due consideration to the drawbacks of the conventional technique, to provide an image decoding and display device capable of reducing a memory size of a bank in a frame memory to store a B picture without increasing a decoding performance and capable of realizing a vertical reduction filter function.

In accordance with a preferred embodiment of the present invention, an image decoding and display device comprises a control section, an image decoding section, a frame memory, a frame memory interface, and a video interface. The control section controls the entire operation of the image decoding and display device. The image decoding section inputs encoded image data transferred from outside of the image decoding and display device, and decodes the encoded image data under the control by the control section, and generates decoded image data. The frame memory comprises banks, a memory size of each of which is one frame for storing the decoded image data, and a bank made up of a plurality of sectors and whose memory size is not less than 0.5 frame for storing the decoded image data of a frame B. The frame memory interface inputs the decoded image data outputted from the image decoding section according to the control of the control section, writes the decoded image data into the frame memory, and reads the decoded image data stored in the frame memory. The video interface inputs the decoded image data transferred from the frame memory interface, converts the decoded image data in format, and outputs the decoded image data converted to outside. In the image decoding and display device described above, under a fixed mapping mode by the control of the control section, the frame memory interface writes the decoded image data into predetermined sectors in the frame memory, and under a dynamic mapping mode by the control of the control section, the frame memory interface refers a sector information table that shows the use state of each of the plurality of sectors in the frame memory in order to search unused sector, and allocates the unused sector when the frame memory interface writes the decoded image data into the frame memory, and release the used sector when decoded image data are read.

In the image decoding and display device as another preferred embodiment of the present invention, the frame memory consists of a bank 0, a bank 1, and a bank 2, and a memory size of each of the bank 0 and the bank 1 is one frame in which the decoded image data of one frame are stored, and the bank 0 and the bank 1 store I/P frames to be used as reference image data. In the image decoding and display device described above, a memory size of the bank 2 is not less than 0.5 frame, and the bank 2 is divided into the plurality of sectors, and each sector in the bank 2 stores the decoded image data of the frame B.

In the image decoding and display device as another preferred embodiment of the present invention, when the frame memory interface performs the management of the bank 2 in the frame memory under the fixed mapping mode and decoded image data of both two frames are stored in the frame memory simultaneously, the frame memory interface controls so that the decoding process by the image decoding section is temporarily halted while observing display lines.

In the image decoding and display device as another preferred embodiment of the present invention, when the frame memory interface performs the management of the bank 2 in the frame memory under the dynamic mapping mode, the frame memory interface searches unused sectors in the bank 2 while referring the sector information table when a sector allocation instruction for the sectors in the bank 2 by the frame memory interface is activated, writes the decoded image data into the unused sector searched, and releases the sector in the bank 2 after the decoded image data in the sector are read.

In the image decoding and display device as another preferred embodiment of the present invention, the frame memory consists of a bank 0, a bank 1, and a bank 2, and a memory size of each of the bank 0 and the bank 1 is one frame in which the decoded image data of one frame are stored, and the bank 0 and the bank 1 store I/P frames to be used as reference image data, and a memory size of the bank 2 is one frame, and the bank 2 is divided into the plurality of sectors, and each sector in the bank 2 stores the decoded image data of the frame B, and in order to execute a 3:2 pull down processing for decoded image data of a frame for continuously displaying during three field time lengths under the dynamic mapping mode, the frame memory interface controls the operation of the frame memory so that a sector releasing instruction is not activated only during a first display time in the three field time lengths for continuously displaying the decoded image data of the frame.

In the image decoding and display device as another preferred embodiment of the present invention, a memory size of the bank 2 is not less than one fields and less than two fields, and in order to execute a 3:2 pull down processing for decoded image data of a frame for continuously displaying during three field time lengths under the dynamic mapping mode, the frame memory interface controls the operation of the frame memory so that a sector releasing instruction is not activated only during a second display time in the three field time lengths for continuously displaying the decoded image data of the frame.

In the image decoding and display device as another preferred embodiment of the present invention, the frame memory consists of a bank 0, a bank 1, and a bank 2, and a memory size of each of the bank 0 and the bank 1 is one frame in which the decoded image data of one frame are stored, and the bank 0 and the bank 1 store I/P frames to be used as reference image data, and a memory size of the bank 2 is not less than one field, and the bank 2 is divided into the plurality of sectors, and each sector in the bank 2 stores the decoded image data of the frame B. Further, in order to perform a pause process under the dynamic mapping mode, the frame memory interface controls so that a sector releasing instruction is not activated while the decoding process for decoding encoded image data by the image decoding section is halted.

In the image decoding and display device as another preferred embodiment of the present invention, the frame memory consists of a bank 0, a bank 1, and a bank 2, and a memory size of each of the bank 0 and the bank 1 is one frame in which the decoded image data of one frame are stored, and the bank 0 and the bank 1 store I/P frames to be used as reference image data. Further, a memory size of the bank 2 is not less than one field, and the bank 2 is divided into the plurality of sectors, and each sector in the bank 2 stores the decoded image data of the frame B, and in order to perform a broken link process under the dynamic mapping mode, the frame memory interface controls so that a sector allocation instruction is not activated while the decoding process for decoding encoded image data by the image decoding section is performed.

In the image decoding and display device as another preferred embodiment of the present invention, the frame memory consists of a bank 0, a bank 1, and a bank 2, and a memory size of each of the bank 0 and the bank 1 is one frame in which the decoded image data of one frame are stored, and the bank 0 and the bank 1 store I/P frames to be used as reference image data, and a memory size of the bank 2 is not less than two fields, and the bank 2 is divided into the plurality of sectors, and each sector in the bank 2 stores the decoded image data of the frame B. Further, in order to display decoded image data that have been reduced in a vertical direction by the image decoding section, the frame memory interface switches to the dynamic mapping mode for the management of the bank 2 in the frame memory.

In the image decoding and display device as another preferred embodiment of the present invention, the frame memory consists of a bank 0, a bank 1, and a bank 2, and a memory size of each of the bank 0 and the bank 1 is one frame where the decoded image data of one frame are stored, and the bank 0 and the bank 1 store I/P frames to be used as reference image data, and the bank 2 is divided into the plurality of sectors, and each sector in the bank 2 stores the decoded image data of the frame B. In addition, when the frame memory interface fails in a search for unused sector in the bank 2 based on the sector information table, the frame memory interface activates a flag in the sector information table corresponding to the sector in the failure search, and the frame memory interface controls so that a sector allocation instruction is not activated while the flag of the sector is activated, and the frame memory interface forcedly switches from the bank 2 where a frame B is stored to the bank 0 or the bank 1 where a frame I or a frame P is stored, and wherein the frame memory interface performs an initialization for the sector information table in order to restart the sector allocation of the bank 2 when the bank 2 is switched to the bank 0 or the bank 1.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 1 is a block diagram showing a configuration of an image decoding and display device according to the first to seventh embodiments of the present invention;

FIG. 2 is a diagram showing a relationship between picture elements and sectors per macro block in a frame memory;

FIG. 3 is a diagram showing a sector management state in the frame memory executed by a frame memory interface incorporated in the image decoding and display device according to the first to seventh embodiments of the present invention;

FIG. 4 is a timing chart of an image decoding and display process performed by the image decoding and display device according to the first embodiment of the present invention;

FIG. 5 is a diagram showing a change of decoded image data stored in the bank 2 in each of time periods in the timing chart shown in FIG. 4;

FIG. 6 is a timing chart of the image decoding and display process performed by the image decoding and display device according to the first embodiment of the present invention;

DESCRIPTION OF THE PREFERRED EMBODIMENTS

Figure 7:
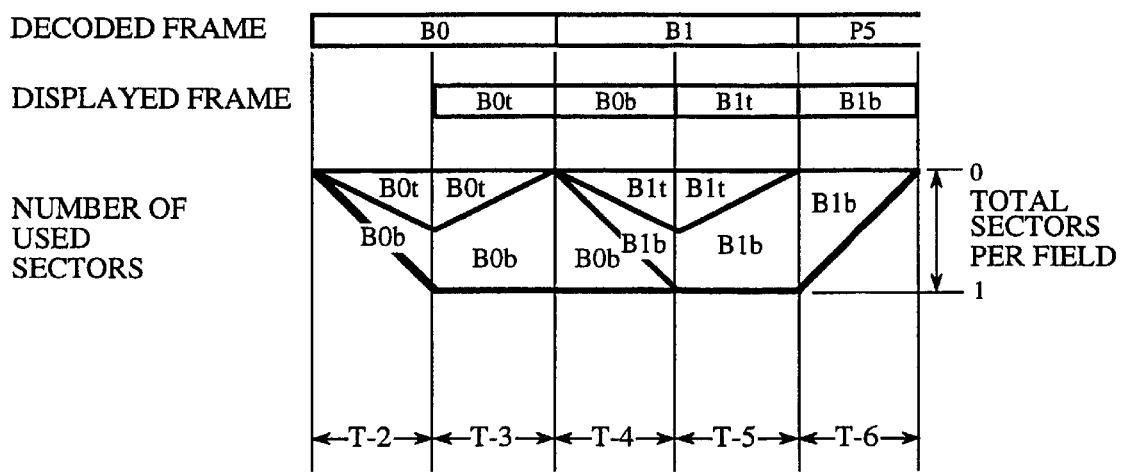
FIG. 7 is a diagram showing a change of the number of used sectors for decoded image data stored in the bank 2 in each of the time periods in the timing chart shown in FIG. 6.

Other features of this invention will become apparent through the following description of preferred embodiments which are given for illustration of the invention and are not intended to be limiting thereof.

First Embodiment

FIG. 1 is a block diagram showing a configuration of the image decoding and display device according to the first to seventh embodiments of the present invention. In FIG. 1, the reference number 1 designates a control section, 2 denotes an image decoding section, and 3 indicates a frame memory interface. The reference number 4 designates a video interface, 5 denotes a frame memory. The image decoding and display device according to the first to seventh embodiments of the present invention comprises the control section 1, the image decoding section 2, the frame memory interface 3, the video interface 4, and the frame memory 5.

In FIG. 1, the thick lines indicate the data flow of encoded image data and decoded image data, and the solid lines denote the input and output flow of control signals among the control section 1, the image decoding section 2, and the frame memory interface 3.

Next, a description will be given of the operation of the image decoding and display device according to the first embodiment.

The control section 1 receives and inputs an operation mode instruction signal "d" transferred from outside of the image decoding and display device of the present invention, and then controls the operation of each sections such as the image decoding section 2, the frame memory interface 3 and the like according to the received operation mode instruction signal "d".

The image decoding section 2 decodes the encoded image data transferred from the outside of the image decoding and display device, and then transfers decoded image data "e" to the frame memory interface 3.

The frame memory interface 3 receives the decoded image data "e" transferred from the image decoding section 2 and then stores the decoded image data "e" into the frame memory 5, and reads the decoded image data "e" stored in the frame memory 5 and outputs one to the video interface 4 as the decoded image data "f".

The frame memory 5 comprises three banks, the bank 0, the bank 1, and the bank 2, as shown in FIG. 1. each of the bank 0 and the bank 1 has the memory size of one frame. The bank 0 and the bank 1 store a I/P frame of an Intra picture and a Predicted picture to be used as a reference image.

The bank 2 stores the B frame and the size of which is more than 0.5 frame. The bank 2 is divided into a plurality of sectors (sector 0, . . . , sector N). The frame memory interface 3 controls the use of the sectors N in the bank 2 through a sector information table 32 shown in FIG. 2.

The video interface 4 performs a format conversion operation for the decoded image data "f" transferred from the frame memory interface 3 and then outputs the converted image data as the video output signals "g" to a display device (not shown) such as a monitor that is an outside device of the image decoding and display device of the first to seventh embodiments shown in FIG. 1.

The control section 1 generates the control signals according to the operation mode instruction signal "d" transferred from the outside of the image decoding and display device, and outputs the generated control signals to the image decoding section 2 and the frame memory interface 3. Thus, the control section 1 outputs the control signal "a" to the frame memory interface 3 in order to control the management of the sectors in the bank 2 in the frame memory 5 to write the decoded image data to the banks 0, 1, and 2, and to read the stored data from the banks 0, 1, and 2 in the frame memory 5. The management operation for the sectors in the bank 2 will be described later in detail.

The frame memory interface 3 outputs the frame memory management information "b" to the control section 1. The frame memory management information "b" include the display output line and sector management information (whose detailed contents will be described later).

The control section 1 outputs the control signal "c" to the image decoding section 2. The control signal "c" indicates the initiation and the finish of the image decoding operation.

FIG. 2 is a diagram showing the relationship between picture elements and the sectors per macro block in the frame memory 5. The data of picture elements shown in FIG. 2 correspond to the NTSC format and the resolution of one frame is 720×480 picture elements.

As shown in FIG. 2, the top fields of 720 picture elements×8 lines and the bottom fields of 720 picture elements ×8 lines correspond to one sector. Each sector of both the top and bottom fields can store data of a macro block in the 45 macro blocks (also referred to as a macro block line) arranged in horizontal direction.

FIG. 3 is a diagram showing the sector management state in the frame memory 5 by the frame memory interface 3 incorporated in the image decoding and display device according to the first to seventh embodiments of the present invention. In FIG. 3, the reference number 31 designates the sector management circuit, and 32 denotes the sector information table.

The sector management circuit 31 is incorporated in the frame memory interface 3 shown in FIG. 1 and operates during the writing decoded image data to the bank 2 and the reading the decoded image data from the sectors in the bank 2 in the frame memory 5. The sector management circuit 31 includes the sector information table 32 to store information of each sector. The information of each sector include a vertical address information field of the frame in the decoded image data, a field parity information field (indicating one of the top and the bottom), a frame number field, and a use flag information field.

The image decoding and display device according to the present invention operates under two operation modes, a fixed mapping mode and a dynamic mapping mode. These two operation modes, a fixed mapping mode and the dynamic mapping mode are set based on the control signal "d", provided from the external of the image decoding and display device, or automatically set under the control of the control section 1 incorporated in the image decoding and display device.

Under the dynamic mapping mode, the sector management circuit 31 searches the sector information table 32 in order to find unused sectors in the bank 2 when new macro block lines of the decoded image data are written to the frame memory 5 and then outputs the information including the number of each of the unused sectors to the control circuit 1. The sector management circuit 31 updates the information in the sector information table 32 corresponding to the unused sectors simultaneously. For example, the sector management circuit 31 sets a flag to the use flag field in the sector information table 32 corresponding to each of the unused sectors).

In addition, when reading the decoded image data stored in the frame memory 5 in order to display the decoded image data on a monitor, the sector management section 31 searches the sector information table 32 in order to read the image element data corresponding to lines to be displayed on the monitor and then outputs the number of each of the searched sectors.

When the data readout operation for all of the image element data (or decoded image data) stored in the sectors is completed, the sector management circuit 31 resets the value of each of the corresponding the use flag fields in the sector information table 32. In addition, the sector management circuit 31 always executes the management of the number of used sectors in the frame memory 5 and outputs the control signal (as a sector full flag) indicating whether all of the sectors are used or not.

On the other hand, while the image decoding and display device operates under the fixed mapping mode, the sector management circuit 31 does not search the sector management table 32 because the picture element data in the frame correspond to the fixed sectors in the frame memory 5 along the vertical addresses.

When the decoded image data are written to the frame memory 5, the sector number is obtained by using the vertical address of the decoded image data. When the decoded image data are read from the frame memory 5, the frame memory interface 3 calculates the sector number based on the display line to be displayed on the monitor and then outputs the sector number to the outside.

Hereinafter, a description will be given of the operation of the image decoding and display device in the state where the frame memory interface 3 performs the management of the bank 2 in the frame memory section 5 under the fixed mapping mode.

FIG. 4 is a timing chart of the image decoding and display process executed by the image decoding and display device according to the first embodiment of the present invention. In FIG. 4, the reference characters "top" and "bot" in the upper side designate the top and the bottom, respectively, as a field parity of the video output signal "g".

The reference character "Ix" denotes a I frame, "Px" indicates a P frame, and "Bx" designates a B frame. The character "x" indicates a display order of the frames. The reference character "Ixt" denotes a top field of the Ix frame, "Ixb" indicates a bottom field of the Ix frame. The reference characters "Pxt", "Pxb", "Bxt", and "Bxb" also have the same meanings, respectively.

The decode bank shown in FIG. 4 designates the bank in the frame memory 5 to which the image data (namely, the decoded image data) of a decoded frame are written. For example, the frame I2 and the frame P5 as decoded frames are written to the bank 0, and the bank 1, respectively.

As shown in FIG. 4, all of the frames B (Bx) are written into the bank 2 in the frame memory 5. The display bank indicate the bank from which the decoded image data are read for the display process. For example, when the decoded image data of the frame I2 are displayed, the display bank field indicates the bank 0 because the frame I2 has been stored in the bank 0 in the frame memory 5.

FIG. 5 is a diagram showing a change of decoded image data stored in the bank 2 in each of the time periods T-2, T-3, T-4, and T-5 in the timing chart shown in FIG. 4. In FIG. 5, the vertical direction of the frame corresponds to the vertical direction shown in FIG. 5. In FIG. 5, the black regions indicate memory fields (corresponding to lines to be displayed) in which decoded image data have already been stored and from which the decoded image data have not been red.

The state (1) of the bank 2 corresponds to the begining state of the time period T-2 in the timing chart shown in FIG. 4. In the state (1), any effective image data are not stored in the bank 2 because the image decoding section 2 does not initiate the decoding process for the frame B0.

The state (2) of the bank 2 shows the middle state of the time period T-2. In the state (2), effective decoded image data of the frame B0 have been stored in the bank 2 by the decoding process.

The state (3) of the bank 2 indicates the boundary state between the time periods T-2 and T-3. In the state (3), the image decoding section 2 has decoded approximately a half of the image data of the frame B0. All of the decoded frame B0 have been stored in the bank 2 in the frame memory 5 because the display process is not initiated.

The state (4) of the bank 2 shows the middle state of the time period T-3. In the state (4), the top fields of the image data of the frame B0 stored in the upper section in the bank 2 become invalid data because the display operation for the top field of the frame B0 has been proceeded.

The state (5) of the bank 2 shows the boundary state between the time periods T-3 and T-4. In the state (5), although the decoding process for the frame B0 has already been completed, because only the image data of the bottom field have been stored in the bank 2 because the top field of the image data stored in the bank 2 have already been outputted for display. There are no decoded image data of the frame B1 in the bank 2 because the image decoding section 2 does not initiate the decoding operation for the frame B1 at this time.

The state (6) of the bank 2 shows the middle state of the time period T-4. In the state (6), the top fields of the image data of the frame B0 stored in the upper section in the bank 2 become invalid data because the display operation for the bottom field of the frame B0 has already been initiated. The effective decoded image data of the frame B1 have been stored in the upper section of the bank 2 because the decoding process for the frame B1 has been performed.

The state (7) of the bank 2 shows the boundary state between the time periods T-4 and T-5. In the state (7), the bank 2 stores no effective data of the frame B0 because the display operation for the frame B0 has already been completed. The bank 2 has stored effective decoded image data of the frame B1 because the image decoding section 2 has decoded a half of the image data of the frame B1.

The state (7) of the bank 2 shows the middle state of the time period T-8. In the state (8), the top field of the image data of the frame B1 stored in the upper section in the bank 2 becomes invalid data because the display process for the top field of the frame B1 has already been initiated.

The state (9) of the bank 2 shows the boundary state between the time periods T-5 and T-6. In the state (9), although the decoding process for the frame b1 has already been completed, the bank 2 has still stored only the effective decoded image data of the bottom field of the frame B1 because the top field of the frame B1 stored in the bank 2 have already been displayed.

During the time periods T-2 and T-3 shown in FIG. 5, because the bank 2 in the frame memory 5 stores only the decoded image data of the frame B0, the control section 1 transfers to the image decoding section 2 the control signal to indicate only the initiation of the decoding operation, not the halt of the decoding operation.

During the time period T-4, it is required for the control section 1 to generate and transfer the control signal to halt the decoding process of the image decoding section 2 temporarily because the image data of both the frames B0 and B1 are simultaneously stored in the bank 2 in the frame memory 5.

In the state (6) shown in FIG. 5, the bank 2 in the frame memory 5 has still stored the image data of the bottom field of the frame B0 to be displayed. According to the proceeding of the decoding process for the frame B1, the decoded image data of both the top and bottom fields of the frame B1 are written into the upper memory field to the lower memory field in the bank 2 in the frame memory 5 in order. When the speed of the decoding process is higher than that of the display process, the decoded image data of the frame B0 to be displayed stored in the bank 2 are overlapped and replaced with the decoded image data of the frame B1. This causes a wrong operation. That is to say, the frame interface 3 outputs the image data of the frame B1 instead of the image data of the frame B0 in the same line.

In order to avoid this error operation, the control section 1 always observes the display line position information in the frame memory management information "b" transferred from the memory interface 3 and transfers the control signal "a" to the image decoding section 2 in order that the image decoding section 2 does not decode the image data of the frame b1 over the line of the image data stored in the bank 2 to be currently displayed.

During the time period T-5, it is not necessary to halt the decoding process by the image decoding section 2 because only the decoded image data of the frame B1 are stored in the bank 2 in the frame memory 5.

As described above, when the frame memory interface 3 performs the management of the bank 2 in the frame memory 5 under the fixed mapping mode, the control section 1 observes the display line of the decoded image data to be displayed and transfers the control signal to the image decoding section 2 so that the decoding operation does not proceed over the line of the decoded image data stored in the bank 2 to be displayed only while the decoded image data of both the frames 0 and 1 are mixed in the bank 2. This can perform both the image decoding and display processes correctly.

Next, a description will be given of the operation of the image decoding and display device in the state where the frame memory interface 3 performs the management of the bank 2 in the frame memory 5 under the dynamic mapping mode.

FIG. 6 is a timing chart of the image decoding and display process performed by the image decoding and display device according to the first embodiment of the present invention. In FIG. 6, the image data to be processed are the same data shown in FIG. 5 and the control of the decode banks and display banks to be displayed are basically same of the control operation shown in FIG. 5. The difference is that the process shown in FIG. 6 further includes the instructions to allocate sectors in the bank 2 and to release sectors from the bank 2 and to initialize the sector management operation.

The allocation and releasing instructions for the sectors in the bank 2 in the frame memory 5 are always activated in the case shown in FIG. 6.

While the sector allocation instruction is activated, the frame memory interface 3 searches unused sectors (in which effective decoded image data are not stored) when the decoded image data are written to the bank 2 in the frame memory 5. Further, while the releasing instruction is activated, the frame memory interface 3 releases the sectors after the decoded image data stored in those sectors in the bank 2 are displayed. Accordingly, the frame memory interface 3 performs the management of the sector allocation for the image data of all of the B frames such as the frame B0, the frame B1 and so on when those image data are written into the bank 2 in the frame memory 5 and the management of the sector releasing process when the image data are read from the frame memory 5 in order to display the image data on a monitor. This is to say, the image data of all of frames B are displayed just once.

FIG. 7 is a diagram showing a change of the number of used sectors for decoded image data stored in the bank 2 in the frame memory 5 in each of the time periods T-2, T-3, T-4, T-5, and T-6 in the timing chart shown in FIG. 6. In FIG. 7, the thick lines indicate the change of the total number of the sectors of the top field and the bottom field of each frame that have been used in the bank 2 in the frame memory 5. That is to say, because the decoding operation for both the top and bottom fields of the frame B0 is proceeded and the sector allocation instruction is activated during the time period T-2, and the number of the used sectors is increased. The total number of the used sectors becomes approximately the number of sectors in one field because a half of the decoding process for both the top and bottom fields of the frame B0 has been completed at the end of the time period T-2.

In the time period T-3, the display process is performed for the top field of the frame B0 in addition to the decoding process for both the top and bottom fields of the frame B0. Because both the sector allocation instruction and the sector releasing instruction are activated, the total number of the used sectors in the bank 2 is increased in proportion to the amount of the decoded image data, and is also decreased in proportion to the amount of the decoded image data that have been displayed.

The amount of the image data of the top field of the frame B0 to be decoded during the time period T-3 becomes approximately a half field, and the amount of the decoded image data of the top field of the frame B0 to be displayed is approximately one field. Therefore the number (B0t) of the used sectors for the frame B0 is decreased and reached to zero at the end of the time period T-3.

The amount of the image data of the bottom field of the frame B0 to be decoded during the time period T-3 is approximately a half field. That is to say, the accurate number of the used sectors for the bottom field to be decoded is the number of the sectors that are not decoded during the time period T-2. Because the display process is not carried out during the time period T-3, the total number of the used sectors for the bottom field of the frame B0 becomes the number of sectors in one field at the end of the time period T-3. Therefore the total number of the used sectors is not changed in the time period T-3.

During the time period T-4, the decoding process for both the top and bottom fields of the frame B1 is initiated and the display process for the bottom field of the frame B1 is performed. Because both the sector allocation instruction and the sector releasing instruction are activated, the number of the used sectors is increased in proportion to the amount of the decoded image data, and the total number of the used sectors is decreased in proportion to the number of the image data that have been displayed.

Because the decoding process for the bottom field of the frame B0 has been completed during the time period T-4, the display process only for the bottom field of the frame B0 is carried out. Thereby, the total number of the used sectors for the bottom field is gradually decreased in proportion to the display operation. At the end of the time period T-4, the number of the used sectors for the bottom field (B0b) of the frame B0 becomes zero.

On the other hand, during the time period T-4, because the amount of the image data of the top and bottom fields of the frame B1 to be decoded is approximately a half field, and the display process for the top and bottom fields of the frame B1 is not carried out, the total number of the used sectors for the top and bottom fields is increased following the proceeding of the decoding process for the top and bottom fields of the frame B1. As a result, at the end of the time period T-4, the total number of the used sectors becomes approximately the number of sectors in one field.

During the time, period T-5, the decoding process is carried out for both the top and bottom fields of the frame B1 and the display process for the top field of the frame B1 is performed. Because both the sector allocation instruction and the sector releasing instruction are activated during the time period T-5, the number of the used sectors is increased in proportion to the amount of the decoded image data and also decreased in proportion to the proceeding of the display process.

The amount of the image data of the top field of the frame B1 to be decoded during the time period T-5 is approximately a half field, and the amount of the decoded image data of the top fields of the frame B1 to be displayed during the time period T-5 is one field. Therefore, the total number of the used sectors for the top fields of the frame B1 is gradually decreased. As a result, at the end of the time period T-5, the number of the used sectors for the top field (B1t) of the frame B1 becomes zero.

In addition, because the amount of the decoded image data of the bottom field of the frame B1 during the time period T-5 is approximately a half field, and the display process does not performed for the decoded image data of the bottom field of the frame B1, the number of the used sectors for the bottom field (B1b) of the frame B1 during the time period T-5 is increased and is reached to the number of sectors in one field at the end of the time period T-5. Therefore, the total number of the used sectors in the bank 2 is not changed during the time period T-5. As a result, at the end of the time period T-5, the total number of the used sectors for both the top field (B1t) and the bottom field (B1b) of the frame B1 becomes the number of sectors in one field.

During the time period T-6, the decoding process is performed for the frame P5 and the display process is also performed for the bottom field of the frame B1. Although the sector allocation instruction is activated, the sector allocation process is not performed because the decoded image data of the frame P5 are stored into the bank 1 in the frame memory 5, not into the bank 2. In addition, the number of the used sectors is decreased in proportion to the amount of the decoded image data that have been displayed because the sector releasing instruction is activated. Because the decoding process for the frame B1 has been already completed, only the display process for the bottom field of the frame B1 is performed. Accordingly, the number of the used sectors for the bottom field (B1b) of the frame B1 is decreased and then reached to zero at the end of the time period T-6. During the time period T-6, the bank 2 in the frame memory 5 stores only the decoded image data of the frames B0 and B1, not stores the decoded data for the frame P5, the number of the used sectors is decreased during the time period T-6 and reached to zero at the end of the time period T-6.

Because the decoding process must be halted only when the number of the unused sectors becomes zero during each of the time periods T-2, T-3, T-4, T-5, and T-6 shown in FIGS. 6 and 7, the control section 1 always observes the sector full flag in the frame memory management information "b" transferred from the frame memory interface 3 and generates and transfers the control signal "c" to indicate the halt of the decoding operation to the image decoding section 2 when the value of the sector full flag is "1", for example.

As described above, the image decoding and display device according to the first embodiment has the configuration and operation described above. That is to say, while the frame memory interface 3 controls the bank 2 in the frame memory 5 under the dynamic mapping mode, the frame memory interface 3 observes the number of the used sectors in the bank 2 by referring the sector information table 32 and searches unused sectors in the bank 2 and allocates the unused sectors when the decoded image data are written into the bank 2, and releases the used sectors in the bank 2 when the decoded image data in the bank 2 are red for the display process. Therefore even if the memory size of the bank 2 in the frame memory 5 is decreased, the image decoding and display device can perform the image decoding and display processes correctly. In addition, the minimum memory size of the bank 2 in the frame memory 5 is approximately one field. Accordingly, the image decoding and display device of the present invention has the effect that the memory size of the frame memory can be decreased.

Second Embodiment

Since the configuration of the image decoding and display device according to the second embodiment is the same as that of the first embodiment shown in FIGS. 1, 2 and 3, the same reference numbers and the same reference characters are used and the explanation for them in omitted here.

The image decoding and display device of the second embodiment performs a pull down display processing to execute a conversion process for a frame rate.

Next, a description will be given of the operation of the image decoding and display device of the second embodiment.

First, the 3:2 pull down display processing by the image decoding and display device of the second embodiment will be explained.

The memory size of the bank 2 in the frame memory 5 is one frame (two fields) or more. The following description will explain only the case where the frame memory interface 3 controls the management of the bank 2 in the frame memory 5 under the dynamic mapping mode.

The 3:2 pull down display processing is to convert a frame rate of image data of 24 frames per second that are used in movies based on the NTSC (National Television System Committee) format of 29.97 frame per second.

Figure 8:
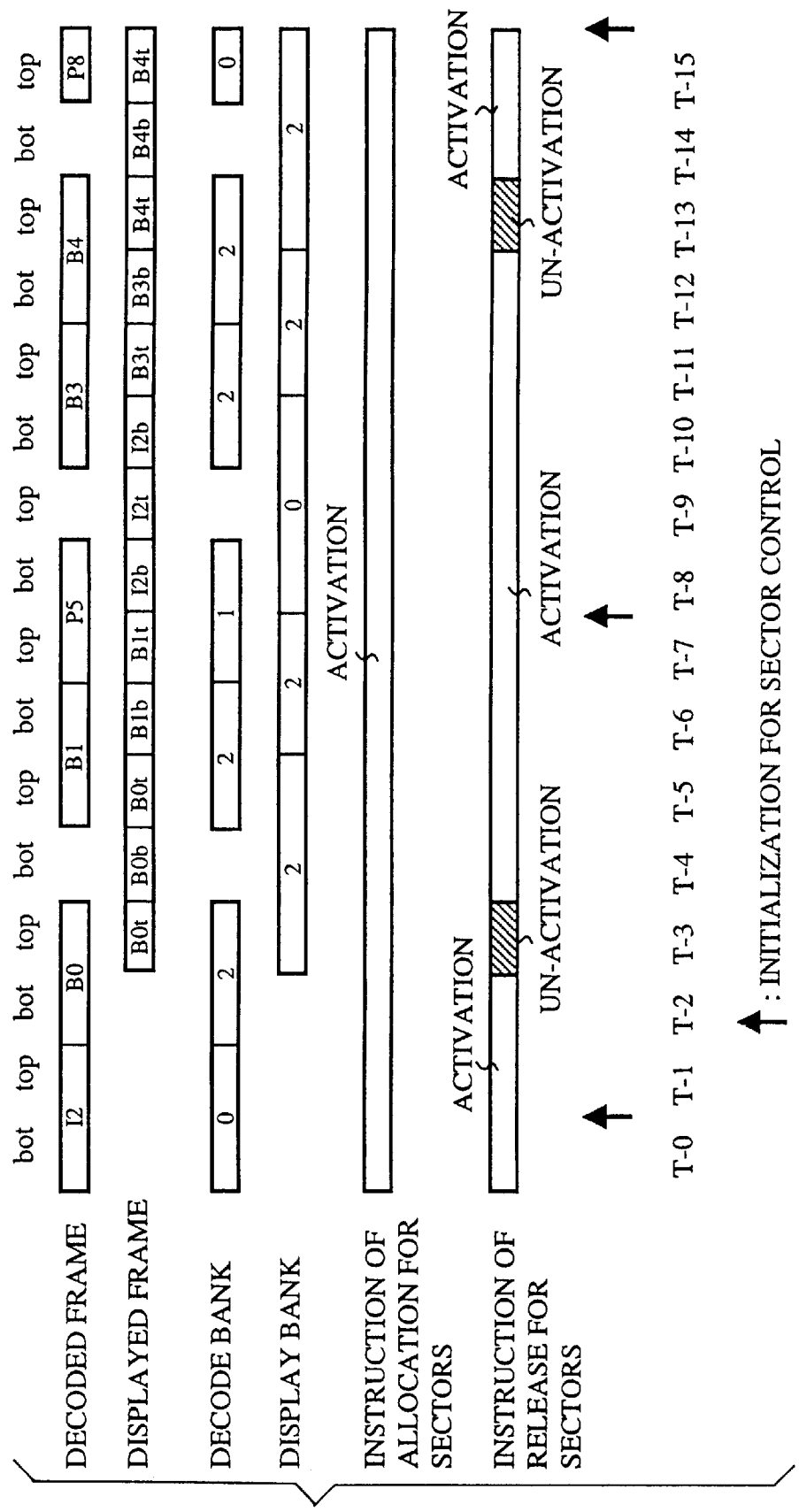
FIG. 8 is a timing chart of the image decoding and display process performed by the image decoding and display device according to the second embodiment of the present invention.

FIG. 8 is a timing chart of the image decoding and display process performed by the image decoding and display device according to the second embodiment of the present invention. The reference characters shown in FIG. 8 are the same meanings of the reference characters used in FIG. 6.

The difference between the timing charts of the first embodiment shown in FIG. 6 and the second embodiment shown in FIG. 8 is that the timing chart of the second embodiment shown in FIG. 8 has the frame of three field time display. That is to say, FIG. 8 shows the three field time display for the B0 frame, I2 frame, and B4 frame.

The sector allocation instruction is always activated during all of the time periods shown in FIG. 8. The sector releasing instruction is not activated only during the time periods T-3 and T-13, and it is activated during other time periods.

When the sector releasing instruction is not activated, the frame memory interface 3 does not release the used sector even if all of the decoded image data in the used sectors have been displayed. Therefore the decoded image data of the top field of the frame B0 that have been displayed during the time period T-3 are still remained in the bank 2 in the frame memory 5. As a result, the decoded image data can be displayed during the following time period T-5.

Similarly, during the time period T-13, because the frame memory interface 3 does. not release the used sectors that store the decoded image data of the top field of the frame B4 even if those decoded image data are displayed, the decoded image data are still remained in the frame memory 5. As a result, those decoded image data can be displayed during the following time period T-15.

As described above, the 3:2 pull down display processing can be performed by halting the sector releasing process for the frames of three field time display during the first display operation by the frame memory interface 3.

Figure 9:
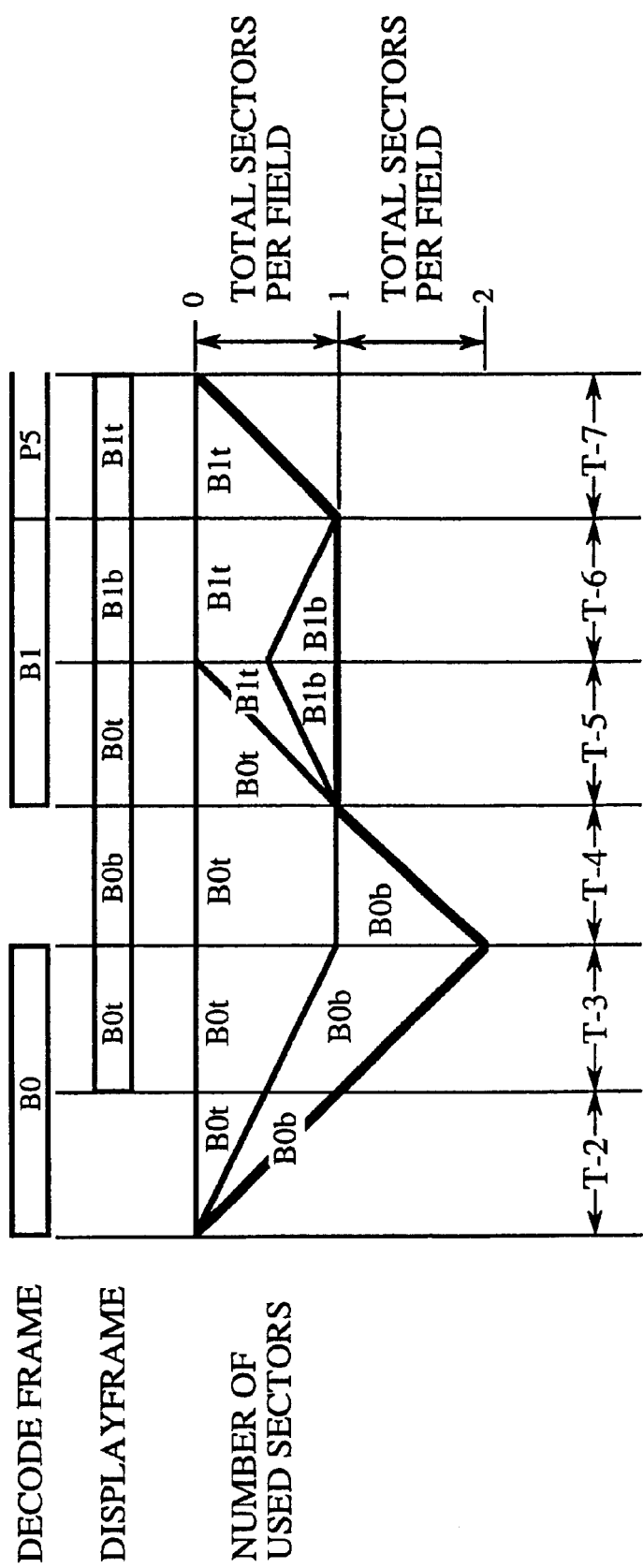
FIG. 9 is a diagram showing a change of the number of used sectors for decoded image data stored in the bank 2 in each of the time periods in the timing chart shown in FIG. 8.

FIG. 9 is a diagram showing a change of used sectors for decoded image data stored in the bank 2 in each of the time periods T-2, T-3, T-4, T-5, T-6, and T-7 in the timing chart shown in FIG. 8. FIG. 9 shows the change of the number of the used sectors for each of the top field and the bottom field in each frame.

During the time period T-2 shown in FIG. 9, because the decoding process is proceeded for both the top and bottom fields of the frame B0 and the sector allocation instruction is activated, the total number of the used sectors is increased. At the end of the time period T-2, the total number of the used sectors becomes approximately the number of sectors in one frame because a half of the decoding process for both the top and bottom field of the frame B0 is completed at the end of the time period T-2.

During the time period T-3, the decoding process for both the top and bottom fields of the frame B0 is proceeding and the display operation for the top field of the frame B0 is also carried out. Further, although the sector allocation instruction is activated and the total number of the used sectors is thereby increased in proportion to the amount of the decoded image data, the total number of the used sectors is not decreased because the sector releasing instruction is not activated by the frame memory interface 5. Accordingly, the number of the used sectors for the top and bottom fields of the frame B0 is increased. As a result, the total number of the used sectors becomes the number of sectors in one frame at the end of the time period T-3. Accordingly, during the time period T-3, the total number of the used sectors is changed from the number of sectors in the one field to in two fields (one frame).

During the time period T-4, the decoding process is not performed and only the display process for the bottom field of the frame B0 is carried out. The number of the used sectors is not changed because the decoding process by the image decoding section 2 is halted during the time period T-4. However, the number of the used sectors in the bank 2 for the bottom field (B0b) of the frame B0 is decreased and reached to zero at the end of the time period T-4 in proportion to the proceeding of the display process for the bottom field of the frame B0 because the sector releasing instruction is activated.

Because the display operation for the top field of the frame B0 is not performed, the number of the used sectors for the top field (B0t) of the frame B0 is not changed. Accordingly, the total sum of the used sectors in the bank 2 is changed from the number of sectors in two fields (one frame) to the number of one field.

During the time period T-5, the decoding operation is carried out for both the top and bottom fields of the frame B1 and the display operation for the top field of the frame B0 is performed. Because both the sector allocation instruction and the sector releasing instruction are activated, the number of the used sectors in the bank 2 is increased and also decreased according to the proceeding of both the decoding process and the display process.

During the time period T-5, the display process for the top field of the frame B0 is performed, and the decoding process for the top field of the frame B0 is not performed.

Because the sector releasing instruction is activated by the frame memory interface 3, the number of the used sectors for the top field (B0t) of the frame B0 is decreased and reached to zero at the end of the time period T-5.

During the time period T-5, the display operation is not performed and only the decoding operation is performed for both the top and bottom fields of the frame B1.

Accordingly, the number of the used sectors for both the top and bottom fields of the frame B1 is increased and then reached to the number of sectors in one frame at the end of the time period T-5. Thereby, the total number of the used sectors in the bank 2 is not changed during the time period T-5, that is to say, the total number of the used sectors is the number of sectors in one field.

During the time period T-6, the decoding operation is performed for both the top and bottom fields of the frame b1 and the display operation is also performed only for the bottom field of the frame b1, and both the sector allocation instruction and the sector releasing instruction are activated, the number of the used sectors is increased and decreased according to the amount of the decoded image data and the amount of the displayed image data, respectively.

During the time period T-6, because only the decoding process is performed for the top field of the frame B1 and the display operation is not performed for them, the number of the used sectors for the top field (B1t) of the frame B1 is increased and then reached to the number of sectors in one frame at the end of the time period T-6.

Both the decoding process and the display process are performed for the bottom field of the frame B1. Because the amount of the decoded image data of the bottom field of the frame B1 becomes a half field and the amount of the decoded image data to be displayed is one field during the time period T-6, the number of the used sectors for the bottom field of the frame B0 is decreased and reached to zero at the end of the time period T-6. As a result, the total number of the used sectors is not changed during the time period T-6, that is to say, the total number of the used sectors is kept the number of sectors in one field.

During the time period T-7, the decoding process for the P5 frame is performed and the display process for the top field of the frame b1 is also performed. Because the decoded image data of the frame P5 are stored into the bank 1 in the frame memory 5, the proceeding of the decoding process for the frame P5 does not affect any change of the number of the used sectors in the bank 2. Further, because the sector releasing instruction is activated, the number of the used sectors in the bank 2 is decreased in proportion to the number of the top field of the frame B1 that have been displayed.

Only the display operation is performed for the top field of the frame B0 during the time period T-7. The number of the used sectors for the top field of the frame B1 is decreased and reached to zero at the end of the time period T-7. Therefore the total number of the used sectors in the bank 2 is changed from the number of sectors in one field to zero.

During the time periods T-2, T-3, T-4, T-5, and T-6 shown in FIGS. 8 and 9, the control section 1 controls the decoding process performed by the image decoding section 2 in the same manner of the first embodiment. That is to say, the control section 1 receives the frame memory management information "b" transferred from the frame memory interface 3 in order to observe the number of the used sectors in the bank 2, and generates and transfers the control signal to temporarily halt the proceeding of the decoding process for the image data by the image decoding section 2 if the number of the used sectors is over the predetermined number.

As described above, in the image decoding and display device according to the second embodiment, the memory size of the bank 2 is one frame (two fields), and the sector releasing instruction is not Activated only during the first display operation for the frame to be displayed during the three field time periods when the frame memory interface 3 controls the operation of the bank 2 under the dynamic operation mode. Accordingly, the image decoding and display device can perform the 3:2 pull down display processing for the decoded image data.

Third Embodiment

Since the configuration of the image decoding and display device according to the third embodiment is the same as that of the first embodiment shown in FIGS. 1, 2 and 3, the same reference numbers and the same reference characters are used and the explanation for them in omitted here.

The image decoding and display device according to the third embodiment performs a pseudo pull down display processing to execute a conversion process of a frame rate, like the image decoding and display device of the second embodiment.

Next, a description will be given of the operation of the image decoding and display device of the third embodiment.

Hereinafter, the 3:2 pull down display processing by the image decoding and display device will be explained.

The difference between the configurations of the image decoding and display devices of the second and third embodiments is that the memory size of the bank 2 in the frame memory 5 in the device of the third embodiment is not more than two fields. In the following explanation, the frame memory interface 3 performs the management of the bank 2 under the dynamic mapping mode, like the second embodiment.

Figure 10:
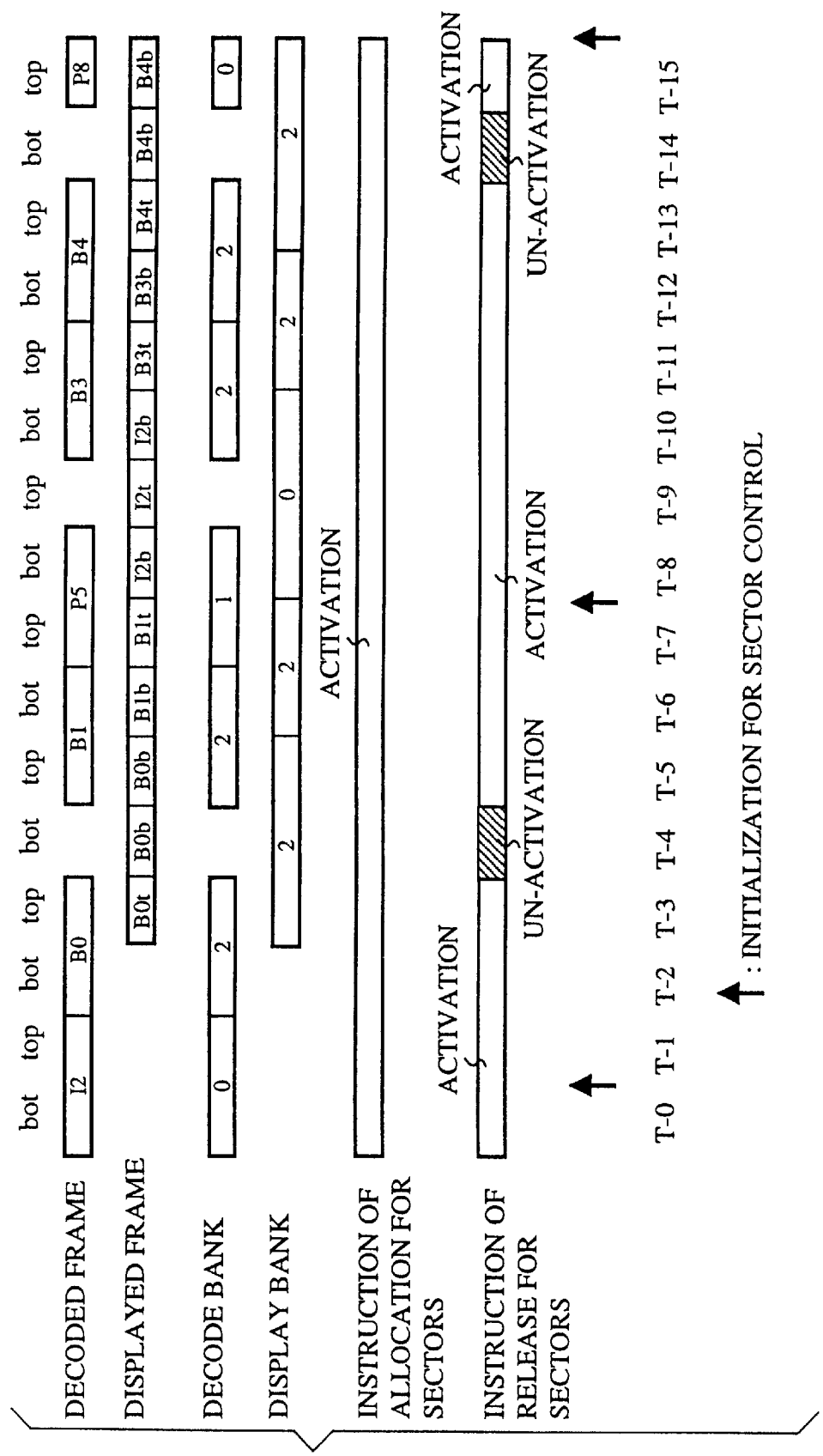
FIG. 10 is a timing chart of the image decoding and display process performed by the image decoding and display device according to the third embodiment of the present invention.

FIG. 10 is a timing chart of the image decoding and display process performed by the image decoding and display device according to the third embodiment. The reference characters and the reference numbers shown in FIG. 10 are the same as those of the second embodiment shown in FIG. 8.

The difference between the timing charts of the third and second embodiments shown in FIGS. 8 and 10 is as follows:

FIG. 10 shows the bottom field (B0b) of the frame B0 during the time period T-5 as the displayed frame; and FIG. 10 shows the bottom field (B4b) of the frame B4 during the time period T-15 as the displayed frame.

Like the second embodiment, the sector allocation instruction is always activated by the frame memory interface 3 during all of the time periods.

The sector releasing instruction is not activated only during both the time periods T-4 and T-14, and is activated during other time periods.

When the sector releasing instruction is activated by the frame memory interface 3, the control section 1 transfers the control signal to halt the sector releasing process to the frame memory interface 3. During the time period T-4, even if the display operation is performed for the decoded image data, the frame memory interface 3 does not release the used sectors. The decoded image data that are displayed during the time period T-4 are still kept in the bank 2 in the frame memory 5 and the same decoded image data stored in the bank 2 can be displayed during the following time period T-5.

Similarly, because the frame memory interface 3 does not release the sectors even if the decoded image data of the bottom field of the frame B4 have been displayed during the time period T-14, the same decoded image data of the bottom field of the frame B4 can be displayed during the following time period T-15.

Thus, it is possible to perform the pseudo 3:2 pull down processing can be performed because only the second sector releasing instruction in the frame to be displayed for the three field time periods is not activated by the frame memory interface 3.

During both the time periods T-5 and T-15 shown in FIG. 10, although the "DISPLAY FRAME" section indicates the bottom field "B0b" at the parity "top" (see the uppermost section during the time period T-5), and the "DISPLAY FRAME" indicates the bottom field "B4b" at the parity "top" (see the uppermost section during the time period T-15), it is possible to supress the deterioration of the picture quality of the image data displayed on a monitor (not shown) by executing a filter processing by the video interface 4, for example.

Figure 11:
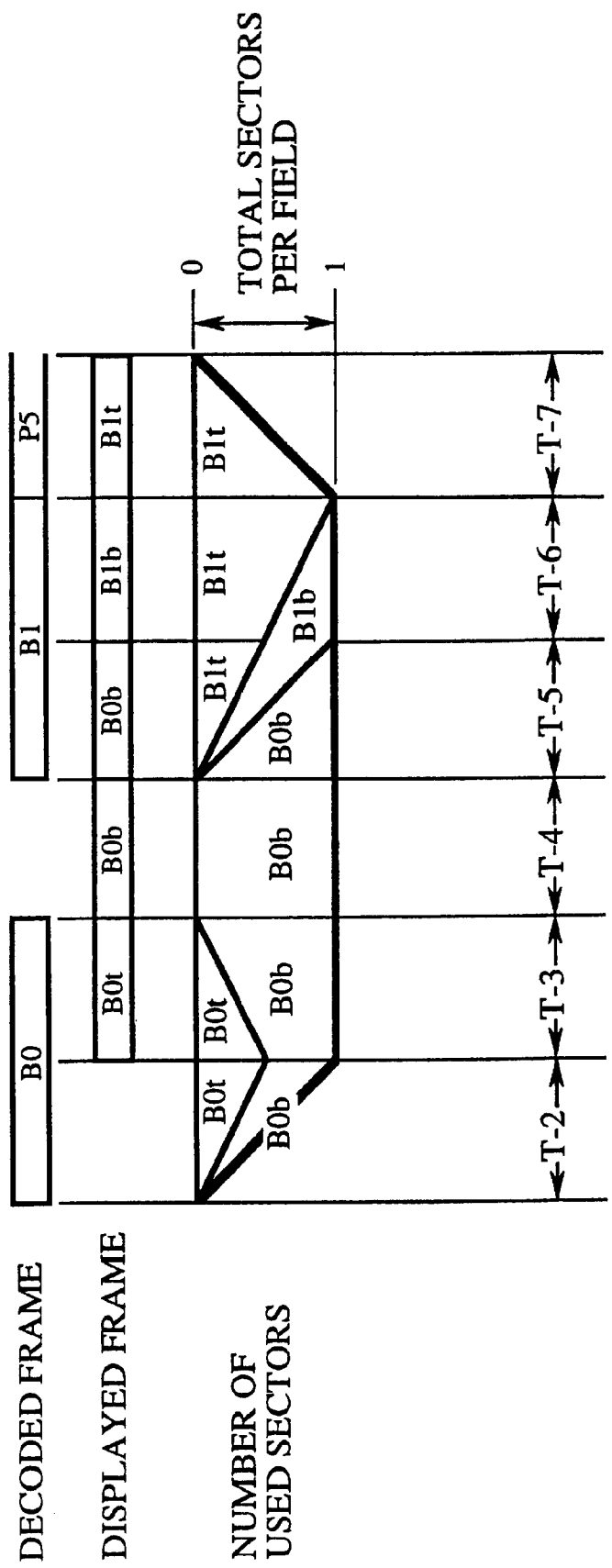
FIG. 11 is a diagram showing a change of the number of used sectors for decoded image data stored in the bank 2 in each of the time periods in the timing chart shown in FIG. 10.

FIG. 11 is a diagram showing a change of the number of the used sectors for decoded image data stored in the bank 2 in each of the time periods T-2, T-3, T-4, T-5, T-6, and T-7 in the timing chart shown in FIG. 10. FIG. 11 shows the change of the number of the used sectors for each of the top fields and the bottom fields in each frame.

During the time period T-2, the decoding process is proceeding for both the top and bottom fields of the frame B0. Because the sector allocation instruction is activated, the number of the used sectors in the bank 2 is increased during the time period T-2.

At the end of the time period T-2, the total number of the used sectors in the bank 2 becomes approximately the number of sectors in one field because the decoding process for a half of each of the top and bottom fields is completed.

During the time period T-3, the decoding process for both the top and bottom fields of the frame B0 is performed and the display process for the top field of the frame B0 is also performed.

During the time period T-3, because both the sector allocation instruction and the sector releasing instruction are activated, the number of the used sectors is increased according to the proceeding of the decoding process and is decreased in proportion to the amount of the displayed image data. During the time period T-3, a half field in the top field of the frame B0 is decoded. Thereby, the decoded image data of one field are displayed, and the number of the used sectors for the top field of the frame B0 is decreased and reached to zero at the end of the time period T-3.

Because the decoding process is performed for the bottom field of the frame B0 of a half field, the number of the used sectors for the frame B0 is increased during the time period T-3 and reached to the number of sectors in one frame at the end of the time period T-4. As a result, the total number of the used sectors in the bank 2 is not changed during the time period T-3, that is to say, the number of the used sectors is the number of sectors in one frame at both the beginning and the end of the time period T-3.

During the time period T-4, only the display process is performed for the bottom field of the frame B0. Because the sector releasing instruction is not activated, the number of the used sectors is not changed. At the end of the time period T-4, the number of the used sectors is the number of sectors in one frame.

Because only the decoded image data of the bottom field (B0b) of the frame B0 are stored in the bank 2, the total number of the used sectors is not changed, that is to say, the total number of the used sectors equals to the number of sectors in one field at both the beginning and the end of the time period T-4.

During the time period T-5, the decoding process is performed for both the top and bottom fields of the frame B1 and the display process is performed for the bottom field of the frame B0. Because both the sector allocation instruction and the sector releasing instruction are activated by the frame memory interface 3 during the time period T-5, the number of the used sectors is increased in proportion to the amount of the decoded image data and decreased according to the amount of the displayed image data.

During the time period T-5, the display process is performed for the bottom field of the frame B0. Because the sector releasing instruction is activated, the number of the used sectors for the bottom field (B0b) of the frame B0 is gradually decreased and reached to zero at the end of the time period T-5.

In the time period T-5, only the decoding process is performed for both the top and bottom fields of the frame B1 and the display process is not performed for them. Accordingly, the number of the used sectors for both the top and bottom fields (B1t and B1b) of the frame B1 is increased and reached to the number of sectors of a half field at the end of the time period T-5. Therefore the total number of the used sectors in the bank 2 is not changed during the time period T-5.

During both the time periods T-6 and T-7, because the image decoding and display device of the third embodiment performs the same operation of the image decoding and display device of the second embodiment, the explanation of the operation is omitted here.

In addition, during the time periods T-2, T-3, T-4, T-5, and T-6, the control section 1 in the image decoding and display device of the third embodiment performs the same decoding control by the control section 1 in the image decoding and display device of the second embodiment. That is to say, the control section 1 always observes the number of the used sectors in the bank included in the frame memory management information "b" transferred from the memory interface 3 and transfers the control signal to the frame memory interface so that the number of the used sectors is not over the memory size of the bank 2.

As described above, in the image decoding and display device according to the third embodiment, the memory size of the bank 2 in the frame memory 5 is not less than one field and less than two fields. The frame memory interface 3 controls the operation of the frame memory 5 so that the second releasing instruction is not activated for the frame to be displayed during the three field time periods. Thereby, it is possible to execute the pseudo 3:2 pull down processing for the decoded image data under the dynamic mapping mode.

Fourth Embodiment

Since the configuration of the image decoding and display device of the fourth embodiment is the same as that of the first embodiment shown in FIGS. 1, 2 and 3, the same reference numbers and the same reference characters are used and the explanation for them in omitted here.

The image decoding and display device of the fourth embodiment performs a pause processing.

Next, a description will be given of the operation of the image decoding and display device of the fourth embodiment.

Hereinafter, the pause processing by the image decoding and display device of the fourth embodiment will be explained. The frame memory interface 3 performs the management of the bank 2 under the dynamic mapping mode.

Figure 12:
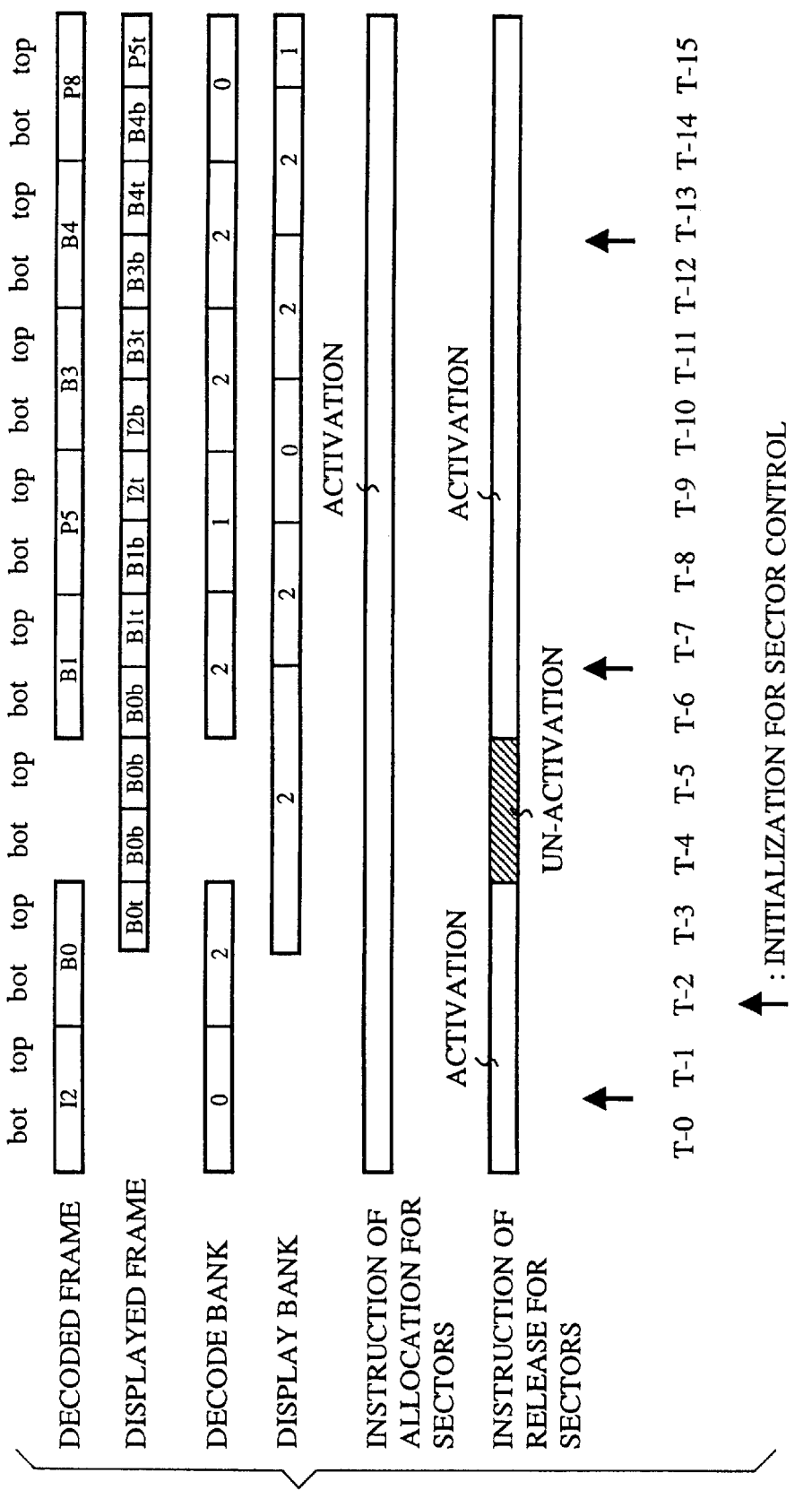
FIG. 12 is a timing chart of the image decoding and display process performed by the image decoding and display device according to the fourth embodiment of the present invention.

FIG. 12 is a timing chart of the image decoding and display process performed by the image decoding and display device according to the fourth embodiment of the present invention. Although the fourth embodiment uses the same decoded image data in the first embodiment, the difference between the fourth embodiment and the first embodiment is that the fourth embodiment further includes a halt operation to halt the proceeding of the decoding process and the updating process during the time periods T-4 and T-5.

The sector allocation instruction is always activated by the frame memory interface 3, like the first embodiment shown in FIG. 6. The sector releasing instruction is not activated only during the time periods T-4 and T-5. When the frame memory interface 3 controls that the sector releasing instruction is not activated during the time periods T-4 and T-5, the used sectors are not released even if all of the decoded image data in the used sectors have been displayed.

During the time periods T-4 and T-5, although the decoded image data in the bottom field of the frame B0 have been displayed, the decoded image data have been kept in the bank 2 in the frame memory 5 because the used sectors corresponding to those decoded image data are not released. Accordingly, those decoded image data corresponding to the bottom field of the frame B0 can be displayed again during the following time period T-5.

As described above, in the fourth embodiment, the pause processing can be performed because the sector releasing instruction is not activated by the frame memory interface 3 during the time period where the decoding process is halted.

Figure 13:
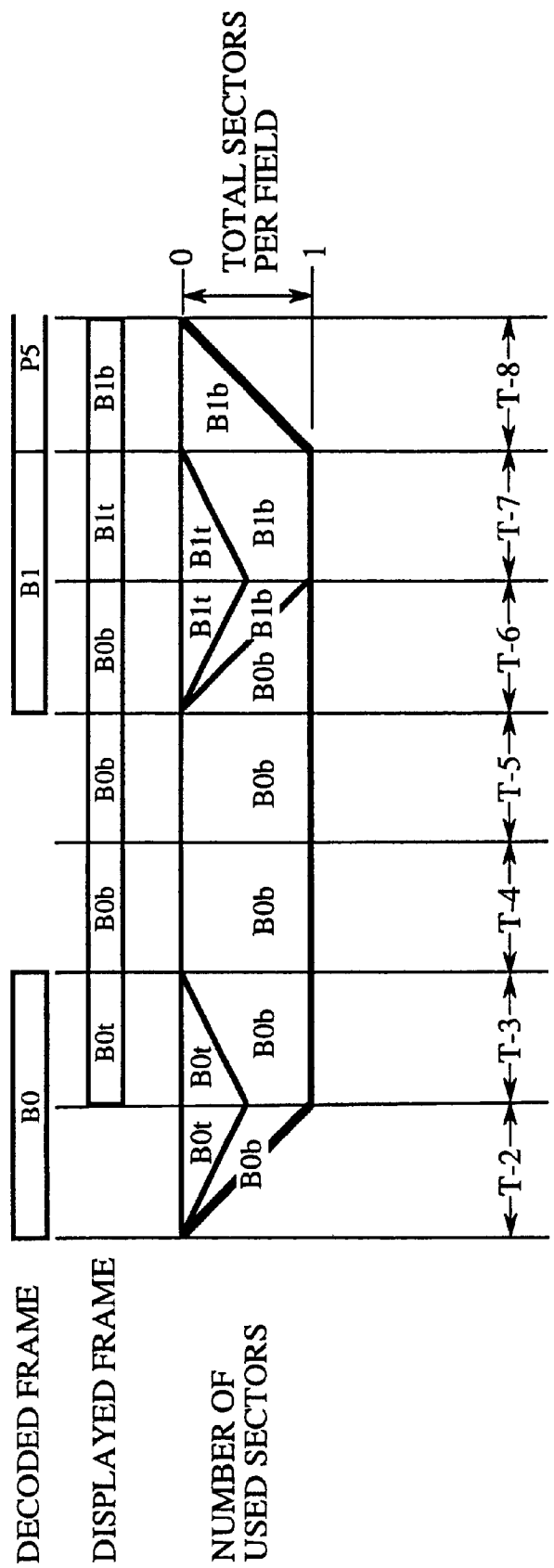
FIG. 13 is a diagram showing a change of the number of used sectors for decoded image data stored in the bank 2 in each of the time periods in the timing chart shown in FIG. 12.

FIG. 13 is a diagram showing a change of the number of used sectors for decoded image data stored in the bank 2 in each of the time periods T-2, T-3, T-4, T-5, T-6, T-7, and T-8 in the timing chart shown in FIG. 12. FIG. 13 shows the change of the number of the used sectors for each of the top fields and the bottom fields in each frame.

Because the operation during the time periods T-2 and T-3 are the same of that in the first embodiment shown in FIG. 7, the explanation for the operation is omitted here.

During the time period T-4, the decoding process is not performed, and the display process for the bottom field of the frame B0 is executed. Because the sector releasing instruction is not activated by the frame memory interface 3, the number of the used sectors in the bank is not changed. Accordingly, the number of the used sectors for the bottom field (B0b) of the frame B0 is still kept in the number of sectors in one frame at both the beginning and the end of the time period T-4. The total number of the used sectors is same.

Like the time period T-4, the image decoding and display device performs the same operation during the time period T-5. The number of the used sectors for the bottom field (B0b) of the frame B0 is not changed and the total number of the used sectors in the bank 2 is also not changed.

During the time period T-6, the decoding process is performed for both the top and bottom fields of the frame B1, and the display process for the bottom field of the frame B0 is also performed. Because the sector allocation instruction is activated and the sector releasing instruction is also activated, the number of the used sectors is increased in proportion to the amount of the decoded image data and also decreased according to the amount of the decoded image data that have been displayed. Because the increasing and decreasing of the number of the used sectors for each frame is the same of those in the state during the time period T-4 in the first embodiment, the explanation for them is omitted here.

In addition, because the operation during the time periods T-7 and T-8 is the same as that of the state during the time periods T-5 and T-6 in the first embodiment shown in FIG. 7, the explanation for,them is also omitted here.

As described above, in the image decoding and display device according to the fourth embodiment, the bank 2 in the frame memory 5 has the memory size of not less than one field. The frame memory interface 3 controls so that the sector releasing instruction is not activated while the decoding process for the encoded image data is halted by the image decoding section 2. Thereby, it is possible to execute the pause processing under the dynamic mapping mode.

Fifth Embodiment

Since the configuration of the image decoding and display device of the fifth embodiment is the same as that of the first embodiment shown in FIGS. 1, 2 and 3, the same reference numbers and the same reference characters are used and the explanation for them in omitted here.

The image decoding and display device of the fifth embodiment performs a broken link processing.

Next, a description will be given of the operation of the image decoding and display device of the fifth embodiment.

Hereinafter, the broken link processing by the image decoding and display device of the fifth embodiment will be explained. The broken link processing is that the decoded image data of the previous frame are continuously displayed without displaying the frame B when it is difficult to perform the decoding process correctly in a case where there is no predicted frame for the frame B. The frame memory interface 3 performs the management of the bank 2 under the dynamic mapping mode.

Figure 14:
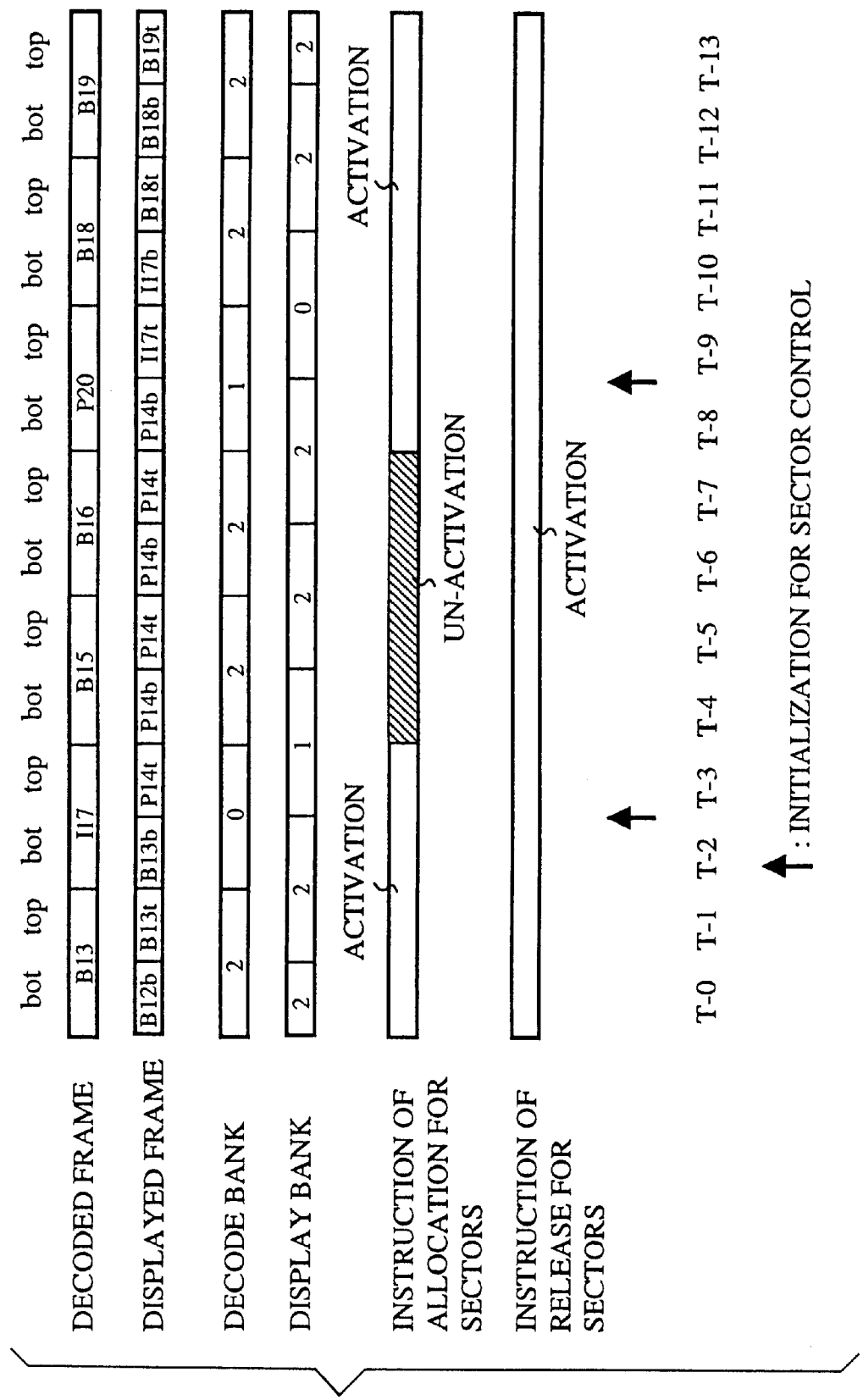
FIG. 14 is a timing chart showing the image decoding and display process performed by the image decoding and display device according to the fifth embodiment of the present invention.

FIG. 14 is a timing chart showing the image decoding and display process performed by the image decoding and display device according to the fifth embodiment of the present invention.

As shown in FIG. 14, the broken link processing handles the frames B15 and B16. When it is not necessary to execute the broken link processing during the time periods T-5 and T-6, the frame memory interface 3 displays the frame P14 instead of the frame B15. Further, when it is not necessary to execute the broken link processing during the time periods T-7 and T-8, the frame memory interface 3 displays the frame P14 instead of the frame B16.

As shown in FIG. 14, because the sector allocation instruction is not activated during the time periods T-4, T-5, T-6, and T-7, the sector allocation is not performed when the decoding operation for the frames B15 and B16 is performed.

The reason is that the sector releasing process caused by the displaying process can not be performed if the frame memory interface 3 indicates to perform the sector allocation operation during the decoding process, because both the frames B15 and b16 are not displayed.

Because the sectors for which the allocation operation is performed and the releasing operation is not performed are not used in the following processes, the image decoding and display device performs the above described control in order to avoid this.

As described above, the image decoding and display device according to the fifth embodiment, the frame memory interface 3 controls so that the sector allocation instruction is not activated during the decoding process for the encoded image data by the image decoding section 2. Thereby, it is possible to execute the broken link processing correctly under the dynamic mapping mode.

Sixth Embodiment

Since the configuration of the image decoding and display device of the sixth embodiment is the same as that of the first embodiment shown in FIGS. 1, 2 and 3, the same reference numbers and the same reference characters are used and the explanation for them in omitted here.

The image decoding and display device of the sixth embodiment performs a processing for a vertical reduction filter. In the six embodiment, the memory size of the bank 2 in the frame memory 5 is one frame (two fields) or more.

Next, a description will be given of the operation of the image decoding and display device of the sixth embodiment.

The control circuit 1 in the image decoding and display device shown in FIG. 1 receives the operation mode instruction signal "d" in order to set the various modes including a mode about the image display control. When receiving the operation mode control signal "d" transferred from the outside that indicates to display decoded image data that are vertically reduced in image, the control section 1 transfers the control signal "a" to the frame memory interface 3 so that the frame memory interface 3 automatically switches the current mode to the dynamic mapping mode during the management for the bank 2 in the frame memory 5.

When the control signal "d" does not indicate the vertical reduction filter mode, the control section 1 transfers the control signal "a" to the frame memory interface 3 so that the frame memory interface 3 automatically switches the current mode to the fixed mapping mode in the management for the bank 2 in the frame memory 5.

Hereinafter, a description will be given of the effect when the management of the bank 2 for the frame memory is automatically switched.

Figure 15:
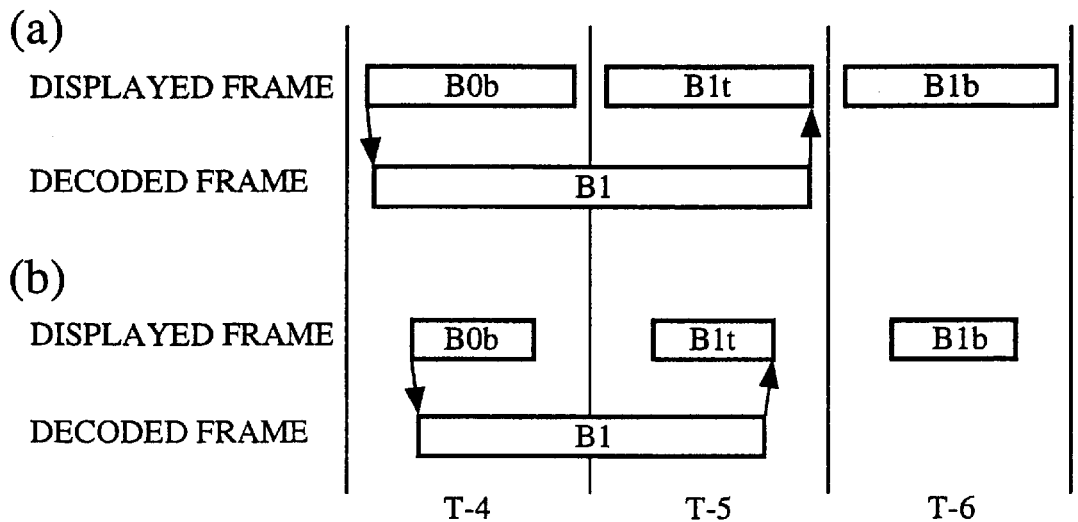
FIG. 15 is a timing chart showing the image decoding and display process performed by the image decoding and display device according to the sixth embodiment of the present invention.

FIG. 15 is a timing chart showing the image decoding and display process performed by the image decoding and display device according to the sixth embodiment of the present invention. That is to say, FIG. 15 shows more detailed timings of the image data decoding and display process under the fixed mapping mode that have been explained in the first embodiment.

In FIG. 15, the reference character (a) indicates that the decoded image data are displayed without any reduction and the reference character (b) indicates that the decoded image data that have been reduced vertically are displayed.

The decoding process for the frame B1 is performed during the periods designated by the reference characters "B1" if in the "DECODED FRAME" section shown in FIG. 15, the decoding process for the frame B1 is executed under the fixed mapping mode while observing the proceeding of the display process for the bottom field (B0b) in the frame B0 so that the decoded image data in the frame memory 5 are not overlapped with newly decoded image data, as explained in the first embodiment.

As shown by the reference character (b) in FIG. 15, under the vertical reduction filter mode, it is necessary for the image decoding section 2 to have a high processing ability when compared with the normal operation because the time for decoding the encoded image data must be reduced.

Figure 16:
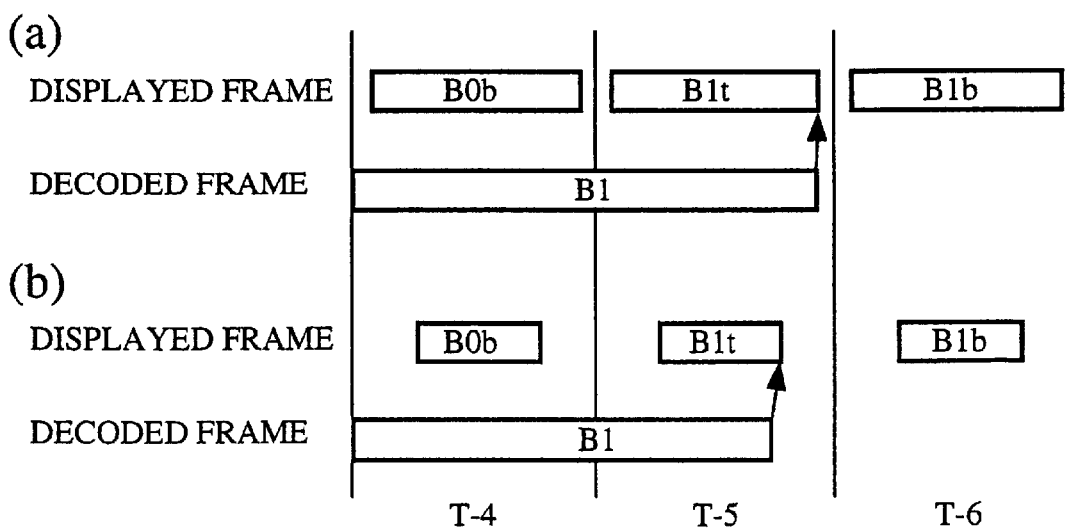
FIG. 16 is a timing chart showing another image decoding and display process performed by the image decoding and display device according to the sixth embodiment of the present invention.

FIG. 16 is a timing chart showing another image decoding and display process under the dynamic mapping mode in more detailed timings. In FIG. 16, the reference character (a) designates the normal display process where the decoded image data are displayed without any reduction, and (b)

indicates that the decoded image data that have been reduced vertically are displayed.

As explained in the first embodiment, the decoding process for the frame B under the dynamic mapping mode is executed while observing the number of used sectors in the bank 2 under the control of the frame memory interface 3 so that the number of the used sectors is not over the predetermined number.

At the beginning of the time period T-4, because the number of the used sectors is the number of sectors in one frame, and the bank 2 in the frame memory 5 in the sixth embodiment has the number of sectors of more than two fields, there are the unused sectors of more than one field. Accordingly, in this case, the decoding process for the frame B1 can be initiated at the beginning of the timing period T-4.

When both the examples shown in FIGS. 15 and 16 are compared, the time in which the decoding process can be executed for the frame b1 under the dynamic mapping mode is longer than that time under the fixed mapping mode. This means that the decoding ability of the image decoding section 2 can be reduced.

As described above, in the image decoding and display device according to the sixth embodiment, the fixed mapping mode and the dynamic mapping mode are automatically switched according to the display output mode of the decoded image data by the video interface 4. That is to say, when the video interface 4 displays the decoded image data that have been vertically reduced, the frame memory interface 3 automatically switches to the dynamic mapping mode for the management of the sectors in the bank 2 in the frame memory 5. Therefore it is possible to correctly perform the display process for the decoded image data without increasing the decoding ability of the image decoding section 2.

Seventh Embodiment

Since the configuration of the image decoding and display device of the seventh embodiment is the same as that of the first embodiment shown in FIGS. 1, 2 and 3, the same reference numbers and the same reference characters are used and the explanation for them is omitted here.

The image decoding and display device of the seventh embodiment performs a processing when the decoding process is halted based on a reason in which the input of encoded image data is halted, for example.

Next, a description will be given of the operation of the image decoding and display device of the seventh embodiment.

Hereinafter, the operation of the image decoding and display device will be explained when the input of encoded image data is halted, for example.

The frame memory interface 3 controls the management of the sectors in the bank 2 in the frame memory 5 under the dynamic mapping mode.

As explained in the first embodiment, the image decoding and display device of the present invention performs its operation based on the assumption that the decoding process for the frame B is proceeded before the display process for the frame B. The decoded image data are written into the frame memory 5 after the sector allocation process is carried out. The used sectors in the bank 2 in the frame memory 5 are released after the display process is carried out.

When the decoding process is halted and the display process is continuously carried out, the sector searching process to search the sectors in which the decoded image data are stored goes wrong, so that the irregularities of the display on a monitor occurs, and only the sector allocation process is performed and the sector releasing process is not carried out after the decoding process is restarted.

When there is the used sectors in the bank 2 that are not released, the actual memory size of the frame memory 5 is reduced. When there are those un-released and used sectors in the frame memory 5, the number of unused sectors is reduced and reached to zero, the decoding process is thereby halted.

In order to avoid this state, the frame memory interface 3 controls that the flag indicating un-released and used sector in the bank 2 is activated when the frame memory interface 3 fails to search the unused sectors for display process of the decoded image data by referring the sector information table 32.

The control section 1 always monitors the flag in the frame memory management information "b" transferred from the frame memory interface 3 and then controls so that the sector allocation instruction is not activated when this flag is activated, and the control section 1 forcibly sets the bank (bank 0 or bank 1), in which the decoded image data of the frame I or the frame P is stored, as the display bank.

Because the decoding process without allocating sectors can be continuously carried out regardless of the number of the unused sectors in the bank 2, the image decoding and display device restarts the decoding process. When the write in bank is switched to the bank 0 or the bank 1, the control section 1 transfers to the frame memory interface 3 the control signal to indicate the initialization of the sector management process. Thereby, the sector allocation instruction is activated again.

As described above, in the image decoding and display device according to the seventh embodiment, when the frame memory interface fails the sector allocation process under the dynamic mapping mode, the frame memory interface controls so that the flags in the sector information table 32 are activated, and the sector allocation instruction is not activated while the flags in the sector information table 32 corresponding to the sectors are activated, the display bank is forcedly switched from the bank 2 in which the image data of the frame B are stored to the bank 0 or the bank 1 in which the image data of the frame I or the frame P are stored. Further, the initialization to the sector information table 32 is carried out, and then the sector allocation process for the bank 2 is restarted after the write-in bank to which the decoded image data are written is switched to the bank 0 or the bank 1. Thereby, the image decoding and display device of the seventh embodiment can performs the image data processing without causing any hang-up even if abnormal display process for the decoded image data happens.

As described above in detail, according to the present invention, while the, frame memory interface 3 controls the bank 2 in the frame memory 5 under the dynamic mapping mode, the frame memory interface 3 observes the number of the used sectors in the bank 2 by referring the sector information table 32 and searches unused sectors in the bank 2, and allocates the unused sectors when the decoded image data are written into the bank 2, and releases the used sectors in the bank 2 when the decoded image data in the bank 2 are red for the display process. Therefore even if the memory size of the bank 2 in the frame memory 5 is decreased, the image decoding and display device can perform the image decoding and display processes correctly. In addition, the minimum memory size of the bank 2 in the frame memory 5 is approximately one field. Thereby, the present invention has the effect that the memory size of the frame memory can be decreased.

Further, according to the present invention, the memory size of the bank 2 is one frame (two fields), and the sector releasing instruction is not activated only during the first display process for the frame to be displayed during the three field time periods when the frame memory interface 3 controls the operation of the bank 2 under the dynamic operation mode. Accordingly, the present invention has the effect that the image decoding and display device can perform the 3:2 pull down display processing for the decoded image data.

Furthermore, according to the present invention, the bank 2 in the frame memory 5 has the memory size of not less than one field and less than two fields. The frame memory interface 3 controls the operation of the frame memory 5 so that the second releasing instruction is not activated for the frame to be displayed during the three field time periods. Thereby, the present invention has the effect that it is possible to execute the pseudo 3:2 pull down processing for the decoded image data under the dynamic mapping mode.

Moreover, according to the present invention, the memory size of the bank 2 in the frame memory 5 is not less than one field. The frame memory interface 3 controls so that the sector releasing instruction is not activated while the decoding process for the encoded image data is halted by the image decoding section 2. Thereby, the present invention has the effect that it is possible to execute the pause processing under the dynamic mapping mode.

In addition, according to the present invention, the frame memory interface 3 controls so that the sector allocation instruction is not activated during the decoding process for the encoded image data by the image decoding section 2. Thereby, the present invention has the effect that it is possible to execute the broken link processing correctly under the dynamic mapping mode.

Furthermore, according to the present invention, the fixed mapping mode and the dynamic mapping mode are automatically switched according to the display output mode of the decoded image data by the video interface 4. That is to say, when the video interface 4 displays the decoded image data that have been vertically reduced, the frame memory interface 3 automatically switches to the dynamic mapping mode for the management of the sectors in the bank 2 in the frame memory 5. Therefore, the present invention has the effect that it is possible to correctly perform the display process for the decoded image data without increasing the decoding ability of the image decoding section 2.

Moreover, according to the present invention, when the frame memory interface fails the sector allocation process under the dynamic mapping mode, the frame memory interface controls so that the flags in the sector information table 32 are activated, and the sector allocation instruction is not activated while the flags in the sector information table 32 corresponding to the sectors are activated, the display bank is forcedly switched from the bank 2 in which the image data of the frame B are stored to the bank 0 or the bank 1 in which the image data of the frame I or the frame P are stored. Further, the initialization to the sector information table 32 is carried out, and then the sector allocation process for the bank 2 is restarted after the write-in bank to which the decoded image data are written is switched to the bank 0 or the bank 1. Thereby, the present invention has the effect that the image decoding and display device can performs the image data processing without causing any hang-up even if abnormal display process for the decoded image data happens.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. An image decoding and display device comprises:
   a control section for control the entire operation of said image decoding and display device;
   an image decoding section for inputting encoded image data transferred from outside of said image decoding and display device and for decoding said encoded image data under the control by said control section, and for generating decoded image data;
   a frame memory comprising banks, a memory size of each of which is one frame for storing said decoded image data, and a bank made up of a plurality of sectors and whose memory size is not less than 0.5 frame for storing said decoded image data of a frame B,
   a frame memory interface for inputting said decoded image data outputted from said image decoding section according to the control of said control section, for writing said decoded image data into said frame memory, and for reading said decoded image data stored in said frame memory; and
   a video interface for inputting said decoded image data transferred from said frame memory interface, for converting said decoded image data in format, and for outputting said decoded image data converted to outside,
   wherein under a fixed mapping mode by the control of said control section, said frame memory interface writes said decoded image data into predetermined sectors in said frame memory, and
   under a dynamic mapping mode by the control of said control section, said frame memory interface refers a sector information table that shows a use state of each of said plurality of sectors in said frame memory in order to search unused sector, and allocates said unused sector when said frame memory interface writes said decoded image data into said frame memory, and release said used sector when decoded image data are read.

2. An image decoding and display device according to claim 1, wherein said frame memory consists of a bank 0, a bank 1, and a bank 2, and a memory size of each of said bank 0 and said bank 1 is one frame in which said decoded image data of one frame are stored, and said bank 0 and said bank 1 store I/P frames to be used as reference image data, and
   wherein a memory size of said bank 2 is not less than 0.5 frame, and said bank 2 is divided into said plurality of sectors, and each sector in said bank 2 stores said decoded image data of said frame B.

3. An image decoding and display device according to claim 2, wherein when said frame memory interface performs the management of said bank 2 in said frame memory under said fixed mapping mode and decoded image data of both two frames are stored in said frame memory simultaneously, said frame memory interface controls so that the decoding process by said image decoding section is temporarily halted while observing display lines.

4. An image decoding and display device according to claim 2, wherein when said frame memory interface performs the management of said bank 2 in said frame memory under said dynamic mapping mode, said frame memory interface searches unused sectors in said bank 2 while referring said sector information table when a sector allocation instruction for said sectors in said bank 2 by said frame memory interface is activated, writes said decoded image data into said unused sectors searched, and releases said sector in said bank 2 after said decoded image data in said sector are read.

5. An image decoding and display device according to claim 1, wherein said frame memory consists of a bank 0, a bank 1, and a bank 2, and a memory size of each of said bank 0 and said bank 1 is one frame in which said decoded image data of one frame are stored, and said bank 0 and said bank 1 store I/P frames to be used as reference image data, and wherein a memory size of said bank 2 is one frame, and said bank 2 is divided into said plurality of sectors, and each sector in said bank 2 stores said decoded image data of said frame B, wherein in order to execute a 3:2 pull down processing for decoded image data of a frame for continuously displaying during three field time lengths under said dynamic mapping mode, said frame memory interface controls the operation of said frame memory so that a sector releasing instruction is not activated only during a first display time in said three field time lengths for continuously displaying said decoded image data of said frame.

6. An image decoding and display device according to claim 5, wherein a memory size of said bank 2 is not less than one fields and less than two fields, wherein in order to execute a 3:2 pull down processing for decoded image data of a frame for continuously displaying during three field time lengths under said dynamic mapping mode, said frame memory interface controls the operation of said frame memory so that a sector releasing instruction is not activated only during a second display time in said three field time lengths for continuously displaying said decoded image data of said frame.

7. An image decoding and display device according to claim 1, wherein said frame memory consists of a bank 0, a bank 1, and a bank 2, and a memory size of each of said bank 0 and said bank 1 is one frame in which said decoded image data of one frame are stored, and said bank 0 and said bank 1 store I/P frames to be used as reference image data, and wherein a memory size of said bank 2 is not less than one field, and said bank 2 is divided into said plurality of sectors, and each sector in said bank 2 stores said decoded image data of said frame B, wherein in order to perform a pause process under said dynamic mapping mode, said frame memory interface controls so that a sector releasing instruction is not activated while said decoding process for decoding encoded image data by said image decoding section is halted.

8. An image decoding and display device according to claim 1, wherein said frame memory consists of a bank 0, a bank 1, and a bank 2, and a memory size of each of said bank 0 and said bank 1 is one frame in which said decoded image data of one frame are stored, and said bank 0 and said bank 1 store I/P frames to be used as reference image data, and wherein a memory size of said bank 2 is not less than one field, and said bank 2 is divided into said plurality of sectors, and each sector in said bank 2 stores said decoded image data of said frame B, wherein in order to perform a broken link process under said dynamic mapping mode, said frame memory interface controls so that a sector allocation instruction is not activated while said decoding process for decoding encoded image data by said image decoding section is performed.

9. An image decoding and display device according to claim 1, wherein said frame memory consists of a bank 0, a bank 1, and a bank 2, and a memory size of each of said bank 0 and said bank 1 is one frame in which said decoded image data of one frame are stored, and said bank 0 and said bank 1 store I/P frames to be used as reference image data, and wherein a memory size of said bank 2 is not less than two fields, and said bank 2 is divided into said plurality of sectors, and each sector in said bank 2 stores said decoded image data of said frame B, wherein in order to display decoded image data that have been reduced in a vertical direction by said image decoding section, said frame memory interface switches to said dynamic mapping mode for said management of said bank 2 in said frame memory.

10. An image decoding and display device according to claim 1, wherein said frame memory consists of a bank 0, a bank 1, and a bank 2, and a memory size of each of said bank 0 and said bank 1 is one frame where said decoded image data of one frame are stored, and said bank 0 and said bank 1 store I/P frames to be used as reference image data, and wherein said bank 2 is divided into said plurality of sectors, and each sector in said bank 2 stores said decoded image data of said frame B, wherein when said frame memory interface fails in a search for unused sector in said bank 2 based on said sector information table, said frame memory interface activates a flag in said sector information, table corresponding to said sector in the failure search, and said frame memory interface controls so that a sector allocation instruction is not activated while said flag of said sector is activated, and said frame memory interface forcedly switches from said bank 2 where a frame B is stored to said bank 0 or said bank 1 where a frame I or a frame P is stored, and wherein said frame memory interface performs an initialization for said sector information table in order to restart said sector allocation of said bank 2 when said bank 2 is switched to said bank 0 or said bank 1.

\* \* \* \* \*